(12) United States Patent
Lesser et al.

(10) Patent No.: US 11,729,469 B2
(45) Date of Patent: Aug. 15, 2023

(54) MULTIMEDIA STREAMING TECHNIQUES USING DIFFERENT SECURITY POLICIES

(71) Applicant: Cinemo GmbH, Karlsruhe (DE)

(72) Inventors: Richard Lesser, Karlsruhe (DE); Ivan Dimkovic, Karlsruhe (DE); Enrik Berkhan, Stutensee (DE)

(73) Assignee: CINEMO GMBH, Karlsruhe (DE)

( * ) Notice: Subject to any disclaimer, the term of this patent is extended or adjusted under 35 U.S.C. 154(b) by 0 days.

(21) Appl. No.: 17/840,112

(22) Filed: Jun. 14, 2022

(65) Prior Publication Data

US 2022/0321960 A1 Oct. 6, 2022

Related U.S. Application Data

(63) Continuation of application No. PCT/EP2020/087715, filed on Dec. 22, 2020.

(30) Foreign Application Priority Data

Dec. 23, 2019 (EP) .................................... 19219367

(51) Int. Cl.
*H04N 7/167* (2011.01)
*H04N 21/4627* (2011.01)
*H04N 21/4363* (2011.01)
*H04N 21/4402* (2011.01)
*H04N 21/4405* (2011.01)

(52) U.S. Cl.
CPC ..... *H04N 21/4627* (2013.01); *H04N 21/4363* (2013.01); *H04N 21/4405* (2013.01); *H04N 21/440263* (2013.01)

(58) Field of Classification Search
CPC .......... H04N 21/4627; H04N 21/4363; H04N 21/440263; H04N 21/4405
See application file for complete search history.

(56) References Cited

U.S. PATENT DOCUMENTS

| 10,893,310 B1 * | 1/2021 | Wu ..................... H04N 21/2387 |
| 10,972,726 B2 * | 4/2021 | Wang ................... H04N 19/115 |
| 11,095,701 B2 * | 8/2021 | Lee ........................ H04L 65/612 |

(Continued)

FOREIGN PATENT DOCUMENTS

| EP | 1 465 426 A1 | 10/2004 |
| WO | 2005/089061 A1 | 9/2005 |

OTHER PUBLICATIONS

International Search Report and Written Opinion issued in application No. PCT/EP2020/087715.

(Continued)

*Primary Examiner* — Mulugeta Mengesha
(74) *Attorney, Agent, or Firm* — McClure, Qualey & Rodack, LLP

(57) ABSTRACT

There is disclosed a streaming technique in which a distributed playback, DP, master device receives a media stream from a content provider and transmits the media stream to a plurality of DP client devices. The DP master device may follow different policies. In case one DP client device has not a level of security sufficient for a particular quality, one policy provides that the stream is degraded, while another policy provides that the stream is to be transmitted by a content provider at a reduced quality.

25 Claims, 9 Drawing Sheets

(56) References Cited

U.S. PATENT DOCUMENTS 11,405,463 B2 * 8/2022 Kitchen ............... H04L 12/283

OTHER PUBLICATIONS

Lindow-Zechmeister, S.; "Tipp: Was ist das Widevine DRM Level?;" https://www.android-user.de/tipp-was-ist-das-widevine-drm-level/; Jan. 2021; pp. 1-6.
Screenshot of HDCP v2.x standard; https://www.digital-cp.com/hdcp-specifications; p. 1.
Widevine; "Widevine L1-L4 standards;" Version 1.2; Mar. 2017; pp. 1-28.

* cited by examiner

MULTIMEDIA STREAMING TECHNIQUES USING DIFFERENT SECURITY POLICIES

CROSS-REFERENCE TO RELATED APPLICATIONS

This application is a continuation of copending International Application No. PCT/EP2020/087715, filed Dec. 22, 2020, which is incorporated herein by reference in its entirety, and additionally claims priority from European Application No. EP 19219367.0, filed Dec. 23, 2019, which is also incorporated herein by reference in its entirety.

Examples here refer, inter alia, to streaming techniques implemented, for examples, in distributed playback (DP) master devices, DP client devices, streaming systems and DP systems, streaming methods, and non-transitory storage units storing instructions which, when executed by a processor, cause the processor to execute the streaming methods.

BACKGROUND OF THE INVENTION

Distributed playback systems are known, e.g. for streaming purposes. For example, a stream may be received from a remote content provider to a DP master device, and retransmitted to a plurality of DP client device, which may provide media content to multiple users, e.g. in a local environment.

Different DP client devices may have different levels of security and may in principle be awarded of the provision of stream with different qualities. It is however difficult to efficiently provide the correct quality to multiple DP client devices when they have different levels of security.

SUMMARY

An embodiment may have a distributed playback, DP, master device for transmitting a media stream to a plurality of DP client devices, the DP master device including a communication interface adapted to: establish a local connection with a plurality of DP client devices; establish a remote connection with a remote content provider, CP, to receive the media stream from the remote CP; perform, through the local connection, a transmission of the media stream to the plurality of DP client devices, wherein each DP client device is associated with a respective level of security, wherein each level of security is associated with a resolution of the media stream; wherein the DP master device is adapted, in case the DP client devices are associated with a same level of security, to perform the transmission of the media stream through the local connection at the resolution associated with the level of security of the DP client devices, and wherein the DP master device is configured, in case the DP client devices are associated with different levels of security, to adopt a second policy, wherein, when the DP master device operates according to the second policy: the communication interface receives, from the remote CP, the media stream at the resolution associated with the DP client device with the higher level of security; the communication interface transmits, to the DP client devices associated with the higher level of security, the media stream at the resolution associated with the to higher level of security; the media stream is degraded, by reducing the resolution, to obtain a degraded media stream at the resolution associated with the lower level of security; and the communication interface transmits, to the DP client devices associated with the lower level of security, the degraded media stream, so that the media stream at the resolution associated with the DP client device with the higher level of security and the degraded media stream are transmitted simultaneously.

According to another embodiment, a streaming method for providing media content to a plurality of DP client devices, wherein each DP client device is associated with a respective level of security, wherein each level of security is associated with a resolution of the media stream, may have the steps of: receiving a media stream at a determined resolution from a remote content provider; transmitting, through a local connection, the received media stream to the plurality of DP client devices, wherein the method includes operating according to a second policy which is: the media stream is received at a resolution associated with the DP client device associated with the lower level of security; and the received media stream is transmitted to all the DP client devices, the media stream being at the resolution associated with the DP client device with the lower level of security; the media stream is received at the resolution associated with the DP client device with the higher level of security; the received media stream is transmitted to the DP client devices associated with the higher level of security, the media stream being transmitted at the resolution associated with the to the higher level of security; and the received media stream is degraded to obtain a degraded media stream at the resolution associated with the lower level of security; and the degraded media stream is transmitted to the DP client devices associated with the lower level of security, so that the media stream at the resolution associated with the DP client device with the higher level of security and the degraded media stream are transmitted simultaneously.

Another embodiment may have a non-transitory digital storage medium having a computer program stored thereon to perform the inventive streaming method when said computer program is run by a computer.

In accordance with an aspect, there is provided a distributed playback, DP, master device for transmitting a media stream to a plurality of DP client devices, the media stream being at a quality selectable between a first quality and a second quality lower than the first quality, the DP master device comprising a communication interface to:
 establish a local connection with at least one first DP client device;
 establish a remote connection with a remote content provider, CP, to receive the media stream at the first quality from the remote CP;
 perform a transmission, through the local connection, of the media stream at the first quality to the at least one first DP client device, the at least one first DP client device having a first level of security;
 receive a request for connection from a second DP client device, the second DP client device having a second level of security;
 the DP master device being configured to:
 verify the second level of security of the second DP client device; and
 in case of verification that the second level of security is lower than the first level of security, operate according to a second policy, according to which:
 the communication interface receives, from the remote CP, the media stream at the first quality;
 the communication interface transmits, to the at least one first DP client device, the media stream at the first quality;
 the media stream, received at the first quality, is degraded, to obtain a degraded media stream (at the second quality; and the communication interface transmits, to the second DP client device, the degraded media stream at the second quality.

In accordance with an aspect, there is provided a distributed playback, DP, master device for transmitting a media stream to a plurality of DP client devices, the DP master device comprising a communication interface adapted to:
  establish a local connection with a plurality of DP client devices;
  establish a remote connection with a remote content provider, CP, to receive the media stream from the remote CP;
  perform, through the local connection, a transmission of the media stream to the plurality of DP client devices, wherein each DP client device is associated to a respective level of security, wherein each level of security is associated to a quality of the media stream;
  wherein the DP master device is adapted, in case the DP client devices are associated to a same level of security, to perform the transmission of the media stream through the local connection at the quality associated to the level of security of the DP client devices, and
  wherein the DP master device is configured, in case the DP client are associated to different levels of security, to adopt a second policy, wherein, when the DP master device operates according to the second policy:
  the communication interface receives, from the remote CP, the media stream at the quality associated to the DP client device with the higher level of security;
  the communication interface transmits, to the DP client devices associated to the higher level of security, the media stream at the quality associated to the to the higher level of security;
  the media stream is degraded to obtain a degraded media stream at the quality associated to the lower level of security; and
  the communication interface transmits, to the DP client devices associated to the lower level of security, the degraded media stream.

In accordance with an aspect, there is provided a distributed playback, DP, master device for transmitting a media stream to a plurality of DP client devices, the media stream being at a quality selectable between a first quality and a second quality lower than the first quality, the DP master device comprising a communication interface to:
  establish a local connection with at least one first DP client device;
  establish a remote connection with a remote content provider, CP, to receive the media stream at the first quality from the remote CP;
  perform a transmission, through the local connection, of the media stream at the first quality to the at least one first DP client device, the at least one first DP client device having a first level of security;
  receive a request for connection from a second DP client device, the second DP client device having a second level of security;
  the DP master device further comprising a controller configured to:
  verify the second level of security of the second DP client device; and
  in case of verification that the second level of security is lower than the first level of security, command the communication interface to establish the local connection also with the second DP client device
  the DP master device being configured to operate according to a second policy, so that:
  the communication interface receives, from the remote CP, the media stream at the first quality;
  the communication interface transmits, to the at least one first DP client device, the media stream at the first quality;
  the media stream, received at the first quality is degraded (210), to obtain a degraded media stream at the second quality; and
  the communication interface transmits, to the second DP client device, the degraded media stream at the second quality.

In accordance with an aspect, there is provided a distributed playback, DP, master device for transmitting a media stream to a plurality of DP client devices, the DP master device comprising a communication interface adapted to:
  establish a local connection with a plurality of DP client device;
  establish a remote connection with a remote content provider, CP, to receive the media stream from the remote CP;
  perform, through the local connection, a transmission of the media stream to the plurality of DP client devices, wherein each DP client device is associated to a respective level of security, wherein each level of security is associated to a quality of the media stream;
  wherein the DP master device is adapted, in case the DP client device are associated to a same level of security, to perform the transmission of the media stream through the local connection at the quality associated to the level of security of the DP client devices, and
  the DP master device further comprising a controller configured, in case the DP client devices are associated to different levels of security, to adopt a second policy, wherein, when the DP master device operates according to the second policy:
  the communication interface receives, from the remote CP, the media stream at the quality associated to the DP client device with the highest level of security;
  the communication interface transmits, to the DP client devices associated to the highest level of security, the media stream at the quality associated to the to the highest level of security;
  the media stream is degraded to obtain a degraded media stream at the quality associated to the lowest level of security; and
  the communication interface transmits, to the DP client devices associated to the lowest level of security, the degraded media stream.

In accordance with an aspect, there is provided a streaming method for providing media content to a plurality of plurality of DP client devices, the media stream being at a quality selectable between a first quality and a second quality lower than the first quality, the method including:
  establishing a local connection with at least one first DP client device;
  establishing a remote connection with a remote content provider, CP, to receive the media stream at the first quality from the remote CP;
  performing a transmission, through the local connection, of the media stream at the first quality to the at least one first DP client device, the at least one first DP client device having a first level of security;
  verifying, in case of request for connection from a second DP client device having a second level of security, the second level of security of the second DP client device;
  in case the second level of security is at least the first level of security or higher, establishing the local connection also with the second DP client device and transmitting, through the local connection, the media stream at the first quality to both the first DP client device and the second DP client device; and in case the second level of security is a level associated to the second quality level or lower, operating according to the following second policy:
  receiving from the remote CP the media stream at the first quality;
  transmitting to the at least one first DP client device the media stream at the first quality;
  degrading the media stream received at the first quality to obtain a degraded media stream at the second quality; and
  transmitting to the second DP client device the degraded media stream at the second quality.

In accordance with an aspect, there is provided a streaming method for providing media content to a plurality of DP client devices, wherein each DP client device is associated to a respective level of security, wherein each level of security is associated to a quality of the media stream, the method comprising:
  receiving a media stream at a determined quality from a remote content provider;
  transmitting, through a local connection, the received media stream to the plurality of DP client devices,
  wherein the method includes operating according to a second policy, which is:
    the media stream is received at a quality associated to the DP client device associated with the lowest or lower level of security; and
    the received media stream is transmitted to all the DP client devices, the media stream being at the quality associated to the DP client device with the lowest or lower level of security; and
  the second policy is so that:
    the media stream is received at the quality associated to the DP client device (120', 120") with the highest or higher level of security;
    the received media stream is transmitted to the DP client devices associated to the highest or higher level of security, the media stream being transmitted at the quality associated to the to the highest or higher level of security; and
    the received media stream is degraded to obtain a degraded media stream at the quality associated to the lowest or lower level of security; and
    the degraded media stream is transmitted to the DP client devices associated to the lowest or lower level of security.

In accordance to an aspect, there is provided a distributed playback, DP, master device for transmitting media stream to a plurality of DP client devices, the media stream being at a quality selectable between a first quality and a second quality lower than the first quality, the DP master device being configured to:
  establish a local connection with at least one first DP client device;
  establish a remote connection with a remote content provider, CP, to receive the media stream at the first quality from the remote CP;
  perform a transmission, through the local connection, of the media stream at the first quality to the at least one first DP client device, the at least one first DP client device having a first level of security;
  receive a request for connection from a second DP client device, the second DP client device having a second level of security;
  verify the second level of security of the second DP client device;
  in case of verification that the second level of security is the first level of security or higher, to establish the local connection also with the second DP client device and transmit, through the local connection, the media stream at the first quality to both the first DP client device and the second DP client device; and
  in case of verification that the second level of security is lower (e.g. associated to the second quality level or lower), to perform a selection among a plurality of policies including a first policy and a second policy,
  wherein the DP master device is configured, when operating according to the first policy, to:
    receive, from the remote CP, the media stream at the second quality; and
    transmit, to both the at least one first DP client device and the second DP client device, the media stream at the second quality; and
  the DP master device being configured, when operating according to the second policy, to:
    receive, from the remote CP, the media stream at the first quality;
    transmit, to the at least one first DP client device, the media stream at the first quality;
    degrade the media stream, received at the first quality, to obtain a degraded media stream at the second quality; and
    transmit, to the second DP client device, the degraded media stream at the second quality.

The DP master device may be configured to determine the disconnection of the second DP client device, and further configured to:
  when operating according to the first policy, to transmit a request to the remote CP for receiving the media stream at the first quality, so as to subsequently receive and transmit the media stream at the first quality; and
  when operating according to the second policy, provide the stream at the first quality to the at least one first DP client device.

In accordance to an aspect, there is provided a distributed playback, DP, master device for transmitting media stream to a plurality of DP client devices, the DP master device being adapted to:
  establish a local connection with a plurality of DP client devices;
  establish a remote connection with a remote content provider, CP, to receive the media stream from the remote CP;
  perform a transmission, through the local connection, of the media stream to the plurality of DP client devices, wherein each DP client device is associated to a respective level of security, wherein each level of security is associated to a quality of the media stream;
  wherein the DP master device is adapted, in case the DP client devices are associated to a same level of security, to perform the transmission of the media stream through the local connection at the quality associated to the level of security of the DP client devices, and
  wherein the DP master device is adapted, in case the DP client devices are associated to different levels of security, to perform a selection among a plurality of policies, the plurality of policies including at least a first policy and a second policy, so that:

the DP master device is configured, when operating according to the first policy, to:
  receive, from the remote CP, the media stream at a quality associated to the DP client device associated with the lowest level of security; and
  transmit, to all the DP client devices, the media stream at the quality associated to the DP client device with the lowest level of security; and
the DP master device is configured, when operating according to the second policy, to:
  receive, from the remote CP, the media stream at the quality associated to the DP client device with the highest level of security;
  transmit, to the DP client devices associated to the highest level of security, the media stream at the quality associated to the to the highest level of security;
  degrade the media stream to obtain a degraded media stream at the quality associated to the lowest level of security; and
  transmit, to the DP client devices associated to the lowest level of security, the degraded media stream.

In accordance to an aspect, there is provided a streaming system comprising the DP master device and the plurality of DP client devices.

In accordance to an aspect, there is provided a remote streaming system comprising the DP master device and the remote CP.

In accordance to an aspect, there is provided a streaming method for providing media content to a plurality of plurality of DP client devices, the media stream being at a quality selectable between a first quality and a second quality lower than the first quality, the method including:
  establishing a local connection with at least one first DP client device;
  establishing a remote connection with a remote content provider, CP, to receive the media stream at the first quality from the remote CP;
  performing a transmission, through the local connection, of the media stream at the first quality to the at least one first DP client device, the at least one first DP client device having a first level of security;
  verifying, in case of request for connection from a second DP client device having a second level of security, the second level of security of the second DP client device;
  in case the second level of security is at least the first level of security or higher, establishing the local connection also with the second DP client device and transmitting, through the local connection, the media stream at the first quality to both the first DP client device and the second DP client device; and
  in case the second level of security is associated to the second quality level or lower, performing a selection among a plurality of policies including a first policy and a second policy,
the method comprising, in case of the first policy:
  receiving from the remote CP the media stream at the second quality; and
  transmitting to both the at least one first DP client device and the second DP client device the media stream at the second quality; and the method comprising, when operating according to the second policy:
  receiving from the remote CP the media stream at the first quality;
  transmitting to the at least one first DP client device the media stream at the first quality;

degrading the media stream received at the first quality to obtain a degraded media stream at the second quality; and
  transmitting to the second DP client device the degraded media stream at the second quality.

The method may comprise:
  determining the disconnection of the second DP client device, and
  when operating according to the first policy, transmitting a request to the remote CP for receiving the media stream at the first quality, so as to subsequently receiving and transmitting the media stream at the first quality; and/or
  when operating according to the second policy, providing the stream at the first quality to the at least one first DP client device.

In accordance to an aspect, there is provided a streaming method for providing media content to a plurality of DP client devices, wherein each DP client is associated to a respective level of security, wherein each level of security is associated to a quality of the media stream, the method comprising:
  receiving a media stream at a determined quality from a remote content provider;
  transmitting, through a local connection, the received media stream to the plurality of DP client devices,
  wherein the method includes selecting among a plurality of policies including a first policy and a second policy, wherein selecting includes determining whether the level of security is the same for the all the DP client devices, wherein:
  the first policy is so that:
    the media stream is received at a quality associated to the DP client device associated with the lowest level of security; and
    the received media stream is transmitted to all the DP client devices, the media stream being at the quality associated to the DP client device with the lowest level of security; and the second policy is so that:
    the media stream is received at the quality associated to the DP client device with the highest level of security;
    the received media stream is transmitted to the DP client devices associated to the highest level of security, the media stream being transmitted at the quality associated to the to the highest level of security; and
    the received media stream is degraded to obtain a degraded media stream at the quality associated to the lowest level of security; and
    the degraded media stream is transmitted to the DP client devices associated to the lowest level of security.

In examples, there is provided a non-transitory storage unit storing instructions which, when executed by the processor, cause the processor to perform a method according to the method above or any of the methods below.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
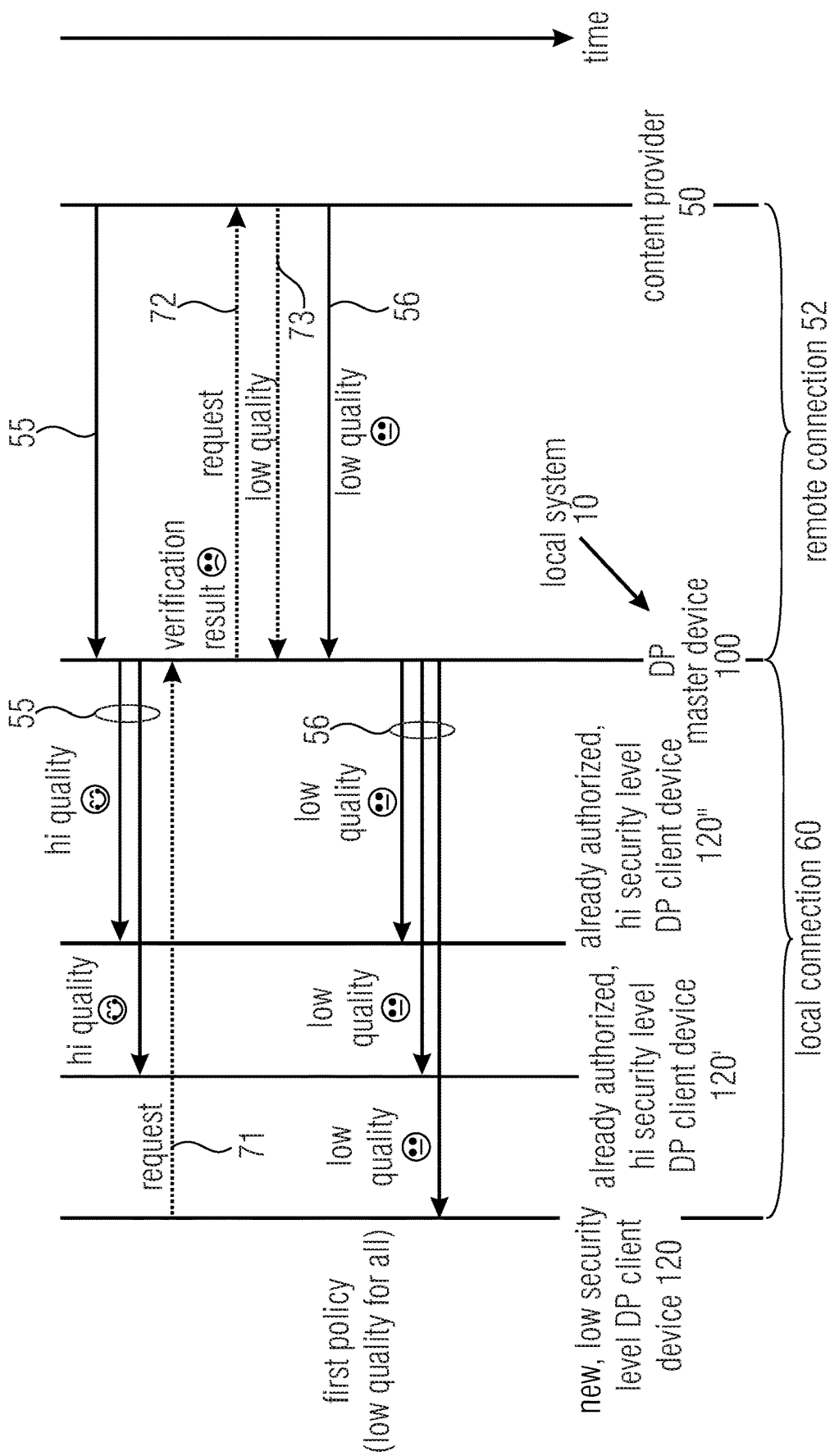
FIGS. 1a and 2a show communication scenarios according to a first policy.
Figure 1B:
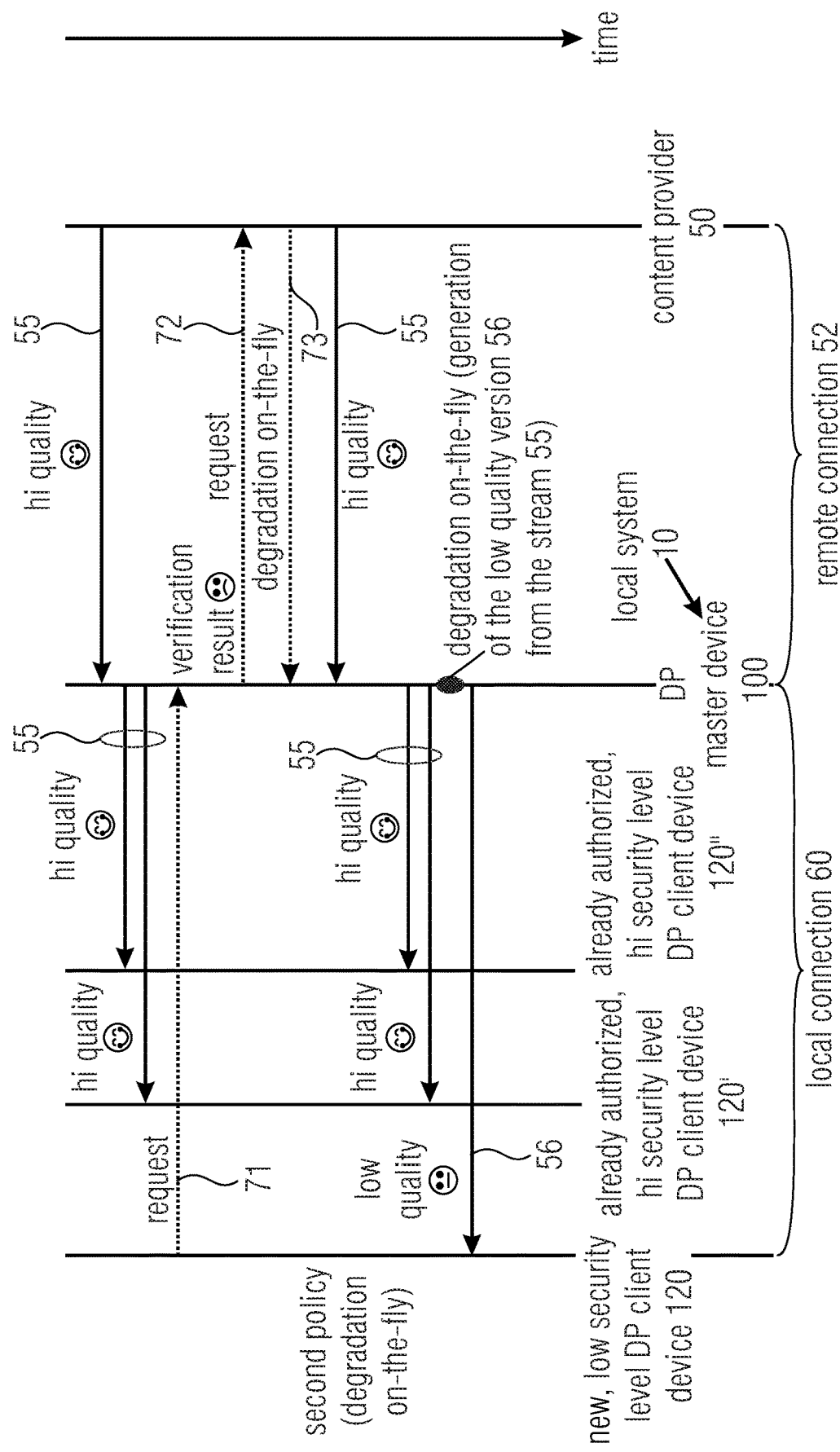
FIGS. 1b and 2b show communication scenarios according to a second policy.
Figure 1C:
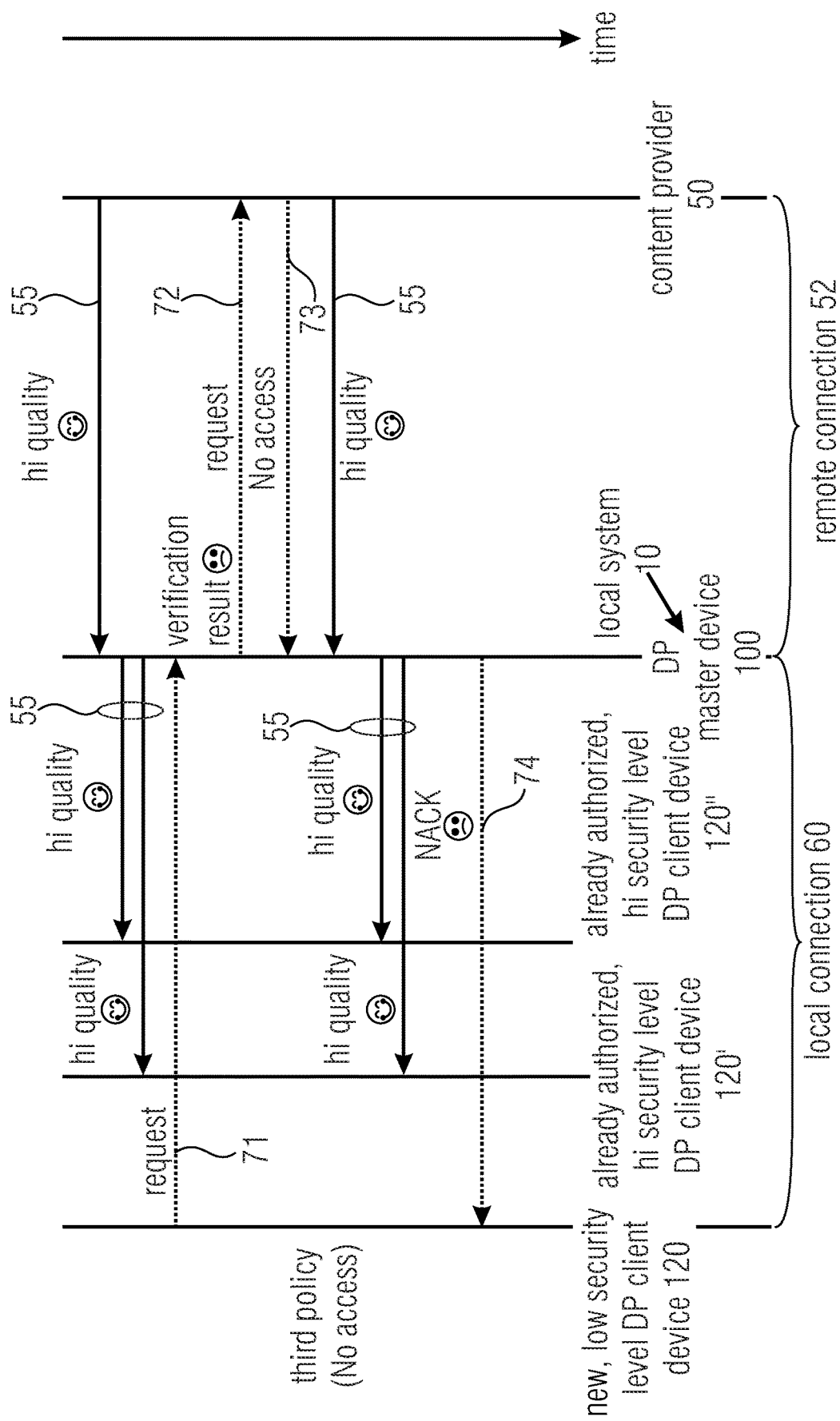
FIG. 1c shows a communication scenario according to a third policy.

FIGS. 1a, 1b, and 1c show a local system 10, e.g. for the provision of media streams (where media may be, for example, audio and/or video). The local system 10 may permit users to enjoy audio and/or video (e.g. music, radio transmissions, tv transmissions, pictures, shared multimedia files, infotainment etc.). The local system 10 (or at least some elements thereof) may be positioned in a particular environment. The environment may be, for example, a vehicle (which may be a car, a train, a bus, a truck, an airplane, etc.).

The local system 10 may include a distributed playback (DP) master device 100 (which may operate as a server) and a plurality of client devices 120, 120', 120". The DP master device 100 and the client devices 120, 120', 120" may form a distributed network.

In examples, the DP master device 100 may be, or comprise, or be part of, a head unit (HU), e.g. for a vehicle. The DP master device 100 may be, for example, fixedly installed (e.g., integrated) in the environment (e.g., it may be fixedly installed in, and stably linked to, or otherwise integrated to, the vehicle, and may be marketed together with the vehicle). The DP master device 100 may have a power supply which is not internal, but is provided by an external storage source (e.g., battery of a car, of an airplane, etc.) of the environment.

Any DP client device 120, 120', 120" of the local system 10 may be either a device fixedly installed in the environment (e.g., in the case of a car, a rear seat unit, or a front seat unit, etc.), or a personal device, such as a personal user equipment, a tablet, or another BYOD (bring-your-own-device) device. In some examples, at least one of the client devices 120, 120', 120" is a fixedly installed device (while it may be provided that at least one other may be a non-fixedly installed device, such as a user equipment, UE). The power supply of the fixedly installed device may be an external power source (e.g., battery of a car, of an airplane, etc.). In alternative examples, at least one client device 120, 120' or 120" is a personal device. At least one personal device may be a user equipment (UE). At least one personal device may be a tablet. At least one personal device may be a smartphone. At least one personal device may be a personal computer. The power source of the personal device may be an internal storage unit (e.g., internal batteries), which may in turn be recharged by an external power source (e.g., battery of a car, of an airplane, the mains etc.). In some examples, some client devices are fixedly installed devices (e.g., a rear seat unit, or a front seat unit, etc.), while some other are personal devices (e.g., personal devices).

The DP master device 100 may digitally transmit media streams to the DP client devices 120, 120', 120". In general terms, the DP master device 100 may be connected with the DP client devices 120, 120', 120" through a local connection 60. The local connection 60 may be a secure local connection. The local connection 60 may be such that only authorized DP client devices may be admitted to the local connection 60. The local connection 60 may be, for example, obtained through a digital local communication network. The local connection 60 may imply communications according to a standard. The standard may be WiFi. The standard may be WLAN. In examples, the local connection may be wireless. In examples, the local connection may be wired (e.g., in a bus, such as a Ethernet connections). In examples, the local connection is wired for some client devices (e.g., head unit, rear seat unit), and is wireless for some other client devices (e.g. personal devices). The local connection 60 may be understood, for example, as supporting a DP session. Through the DP session, media streams may beprovided (e.g. continuously) to the DP client devices 120, 120', 120'.

Each component (DP master device or DP client device) may have (i.e. being associated to) a specific level of security. In general, the DP master device 100 may have the highest level of security, while each DP client device 120, 120', 120" may have the same level of security of the DP master device 100 or a lower level of security than the DP master device 100. The level of security may change among different DP client devices of the same local system 10: for example, at least one first DP client device (e.g., 120) may have a lower level of security than the level of security of at least one second DP client device (e.g., 120', 120"). In general terms, a first and a second DP client devices are associated to a first and a second levels of security, respectively.

The level of security of each DP client device may be associated with the particular techniques which are implemented for avoiding the malicious reception and/or decoding of the stream transmitted by the DP master device 100. The level of security of each DP client device may be associated, in some examples, with the level of security of the cryptographic techniques implemented therein. The level of security may be associated, for example, with a password or one or more keys (e.g., a couple of public/private keys), or to a particular algorithm or to a particular technique used for implementing the algorithm in the DP client. The level of security of the DP client devices 120, 120', 120" can be, for example, according to a Widevine standard: for example, the level of security L1 is higher than the level L3. In general terms, more secure algorithms have a higher level of security to a device, and algorithms implemented in hardware have a higher level of security than algorithms implemented in software. Algorithms implemented in hardware may be include, for example, algorithms implemented in field-programmable gate array (FPGA), in application-specific integrated circuit (ASIC), or in other forms of hardware. Algorithm implemented in software may include, for example, algorithms implemented in firmware, flash, or another form of storage unit. In some examples, fixedly installed devices (e.g., head unit, rear seat unit, etc.) have higher level of security than personal devices (e.g., UEs). In some examples, the level of security is based on criteria which keep into account multiple parameters (e.g., hardware vs. software; fixedly installed vs. personal device; etc.) for defining the level of security.

In examples, the DP master device 100 is adapted to determine the level of security of each DP client device 120, 120', 120" (e.g. by virtue of the DP client device 120, 120', 120" indicating the level of security, or providing a particular password associated to the specific level of security, and/or by determining whether the particular DP client device can decrypt streams encrypted according to a particular secure encryption standard.

In general terms, the DP master device 100 may transmit a stream 55 or 56 to the DP client devices 120, 120', 120". The stream 55 or 56 may be a media stream. The media stream may comprise (e.g. be) one or more audio stream(s) and/or one or more video stream(s). In examples the media stream may include metadata associated to the audio stream and/or a video stream. The stream 55 or 56 may include at least one video stream and at least one audio stream.

The stream 55 or 56 is a digital stream. The stream 55 or 56 may be a compressed stream.

The stream 55 or 56 may be according to a particular standard, such as moving picture expert group (MPEG), moving picture expert group audio layer 3 (MP3), high efficiency video coding (HEVC or H.265), etc.

The stream may have a selectable quality (e.g., resolution). The stream may be chosen at at least a high quality (e.g. stream 55) and a low quality (e.g. stream 56). The quality may be, for example, the resolution, or be associated to the resolution, or to other properties. The video resolution may be associated, for example, to the quantity of pixels that can be displayed in an image of a video stream, or in any case to the amount of information that is transmitted for displaying the image. The audio resolution may be associated, for example, to the amount of information that is transmitted for encoding the sound. In some cases, the resolution may be associated to a maximum bitrate. In general terms, the better the quality, the more pleasant the media consumption experience for the user. The quality may be understood as the expected quality (e.g., the maximum quality) at which each DP client device may expect to receive a stream.

Several standards define different degrees of quality (e.g., different degrees of resolution), which may be followed by the present examples.

The quality (e.g. resolution) of each stream 55 or 56 may therefore be selected among a plurality of degrees (or levels) of quality. In some examples, while a particular stream (e.g. an audio stream) is transmitted with the same quality (e.g. resolution) for all the DP client devices 120, 120', 120", another stream (e.g. a video stream) of the media stream is transmitted at different qualities (e.g. resolutions) for different DP client devices. For example, different video qualities (e.g. resolutions) may follow the different levels of securities of the DP client devices 120, 120', 120". The different levels of security may, in some cases, follow the particular service which is assigned to each DP client device 120, 120', 120": for example, DP client devices associated with premium abonnements will be embodied by higher-security components and will enjoy higher quality, while DP client devices associated with standard abonnements will be embodied by lower-security components, and will enjoy reduced quality.

Therefore, in general terms, a first, higher quality is in principle awarded to streams directed to DP client devices having high level of security, while a second quality (lower than the first quality) is in principle to be awarded to streams directed to DP client devices having a low level of security lower than the high level of security.

In general terms, the DP master device 100 may receive streams 55 and/or 56 from a content provider 50. The content provider 50 may be understood as a remote entity which provides (e.g. on demand) the streams 55 or 56 to the DP master device 100. The remote connection 52 may rely on a digital remote communication network. The remote connection 52 may rely, for example, on a geographical communication network, a wireless mobile phone network (3G, 4G, 5G, UMTS, GSM, and other mobilephone standards). In some cases, the content provider 50 may be associated to a modem, a router, etc. The remote connection 52 may be wireless. In alternative, the remote connection may be through a wired telephone network.

Therefore, it may be understood that a plurality of users enjoy the video and audio remotely provided from the content provider 50 to the DP master device 100 through the remote connection 52 and retransmitted (relayed) from the DP master device 100 to each DP client device 120, 120', 120".

In general terms, the stream 55 or 56 as provided from the content provider (CP) 50 can be in high quality (e.g. high resolution) or low quality (e.g. low resolution). Under the point of view of the band consumption, the low quality (e.g. low resolution) could be understood as advantageous, as it reduces the congestion (e.g., to reduce the consumption of band). Under the point of view of the quality of service, it would also be needed to provide, to each DP client device 120, 120', 120", a stream at the quality associated with the particular level of security of the respective DP client device 120, 120', 120". Under the point of view of the security, it is needed to avoid malicious clients enjoying streams at a quality associated to a higher level of security.

Notwithstanding, in one single environment (e.g. vehicle) it may actually happen that different DP client devices 120, 120', 120" are associated with different levels of security (e.g., different BYOD devices may have different levels of security). It is, however, advantageous to provide for each DP client device 120, 120', 120" the streams 55 or 56 at the quality corresponding to the level of security of the DP client device 120, 120', 120".

Hence, in case of DP client devices 120, 120', 120" having different levels of security, it would be in principle involve the following scenario:

different streams 55 and 56 at different qualities are transmitted from the content provider 50 to the DP master device 100; and the DP master device 100 retransmits the different streams 55 and 56 to the different DP client devices 120, 120', 120" according to the different levels of security of the different DP client devices 120, 120', 120".

However, it has been understood that this scenario is often not feasible and is often not advantageous. At first, the remote connection 52 should be requested to support the provision of two different streams 55 and 56 at different qualities (e.g. different resolutions), which therefore would highly increase the congestion in the remote connection 52. Further, it would result extremely difficult to synchronize the streams 55 and 56 with each other and with other streams of the media streams (if the streams 55 and 56 are video streams, it would be difficult to synchronize them with each other and with the audio streams). Remote connections (such as the connection 52), and in particular the wireless remote connections (e.g., mobile phone networks), are usually impaired by several kinds of disturbances and delays, which may be generated non-deterministically. Situations may arise which cause delays in the transmission of one stream with respect to the other one, hence impairing the synchronizations of the different streams.

Notwithstanding, it has been understood that it is possible to adopt policies which cope with these issues. In examples, the different policies may be adopted in the same embodiment. In some examples, the adopting of a particular policy may be decided based on the determination of the level of security of the different client devices, and may be based, for example, on the decision by the content provider 50.

It has been noted, inter alia, that the local connection 60 is in general less prone to disturbance and delays than the remote connection 52. Further, the local connection 60 is in general easier to be controlled than the remote connection 52. Hence, if, from one first stream, one second stream is generated locally (e.g., by the DP master device 100), it is easier to keep the synchronism between the two streams. Hence, if one second stream is generated from a first stream, it is not necessary to receive two different streams (difficult to synchronize) from the remote content provider 50. Accordingly, it has been understood that the DP master device 100 may generate a second, lower quality stream 56 from a first, high quality stream 55, e.g., by degrading the first, high quality stream 55 (e.g., by re-encoding at lower resolution, adding noise, etc.), so as to simultaneously provide the second, lower quality stream 56 to the low level of security client device(s) (e.g., 120), and the first, high quality stream 55 to the high level of security client device(s) (e.g., 120', 120"). The separate provision of different, synchronized streams can be better operated in the local connection 60 than in the remote connection 52.

An example is provided by the embodiment of FIGS. 1a-1c, which shows three different policies which may be chosen when it is determined that different DP client devices 120, 120', 120" have different levels of security (e.g., at least one first DP client device has a level of security different from at least one second DP client device). The different policies may in principle be implemented independently from each other in different embodiments.

FIG. 1a shows a situation in which the local system 10 includes, besides the DP master device 100, two authorized DP client devices 120' and 120" having high level of security, and currently rendering media content provided through a high quality stream 55 (e.g., a video stream at high definition). The high quality stream 55 may be provided through the remote connection 52 from the content provider 50 to the DP master device 100, and may be relayed from the DP master device 100 to the DP client devices 120' and 120" through the local connection 60.

At a certain time instant, it may happen that a new DP client device 120 performs a request 71 for joining the local connection 60, with the intent of receiving the high quality stream 55. The new DP client device 120 may be, for example, a BYOD device (personal device) of a particular user who also intends to enjoy the multimedia content currently provided to the authorized DP client devices 120' and 120" (in some examples the DP client devices 120' and 120" may be fixed devices, but they could also be mobile devices with high level of security). The request 71 may be part of a handshaking protocol, for example.

Hence, the authorization of the new DP client device 120 is to be verified, e.g., by the controller. In particular, the level of security of new DP client device 120 is checked.

In case of a positive verification of the authorization of the new DP client device 120, the new DP client device 120 is admitted to join the local connection 60: it may receive and decode the high quality stream 55 similarly to the DP client devices 120' and 120" (this scenario is not shown in the figures).

The following scenarios may occur in case the new DP client device 120 is not authorized (by virtue of the level of security of the new DP client device 120 being below the level of security of the two authorized DP client devices 120' and 120").

Hereinbelow, three policies (independent from each other) are shown FIGS. 1a, 1b, and 1c, respectively:

A first policy ("low quality for all", FIG. 1a), according to which a low quality stream 56 is provided to all the DP client devices 120, 120', 120", despite their different levels of security.

A second policy ("degradation on-the-fly", FIG. 1b), according to which a low quality stream 56 is provided to the new DP client device 120, while the authorized DP client devices 120' and 120" continue receiving a high quality stream 55.

A third policy ("No access", FIG. 1c), according to which the access to the local connection 60 is denied to the new client device 120, while the authorized DP client devices 120' and 120" continue receiving a high quality stream 55.

As shown in FIG. 1a ("low quality for all"), the DP master device 100 may adopt the first policy of providing low quality streams 56 for all the DP client devices 120, 120', 120". In examples, this decision may be followed by the DP master device 100 after having requested instructions to the content provider 50. For example, as shown in FIG. 1a, the DP master device 100 may transmit a request 72 for instructions to the content provider 50. The content provider 50 may, in this case, transmit a notification 73 commanding the adoption of a particular policy. In this case, the notification 73 commands the first policy, i.e. the transmission of low quality streams 56 for all the client devices 120, 120', 120". Accordingly, the content provider, CP, 50 may start the transmission of the stream in its lower resolution version 56. Hence, according to this first policy, all the DP client devices 120, 120', 120" receive the low resolution version 56 of the stream, but the congestion in the remote connection 52 will be advantageously reduced. Notably, none of the DP client devices 120, 120', 120" will enjoy a quality higher than the quality associated with the lowest level of security. (In some cases, the DP master device 100 may request to the authorized DP client devices 120', 120" whether they agree with the reduction of the resolution for permitting the new DP client device 100 to receive the stream 56.)

FIG. 1b ("degradation on-the-fly") shows the second policy which may be selected by the DP master device 100 as an alternative to the first policy (or may be, for example, the only policy adopted or, another example, may be adopted among a plurality of policies, which do not comprise the first policy). At the verification that the new DP client device 120 has a lower level of security than the other DP client devices 120' and 120", the selected policy may prescribe that, while the authorized DP client devices 120' and 120" will still receive the high resolution stream 55, the new DP client device 120 will receive the low resolution version 56 of the stream 55. In this case, the stream 55 transmitted from the CP 50 to the DP master device 100 will have a high quality (e.g., high resolution), without the necessity of also transmitting a low resolution version (or more in general, low quality version) of the stream 55. This is because the DP master device 100 may be given the task of degrading, on-the-fly, the stream 55 (as received from the CP 50) to generate a low resolution version 56 of the stream 55, and to provide the degraded low resolution version 56 to the new DP client device 120 (but maintaining the provision of the high resolution stream 56 to the other DP client devices 120' and 120"). This policy does not increase the congestion in the remote connection 52, and permits, at the same time, the simultaneous transmission of the low resolution stream 56 and the high resolution stream 55 to the different DP client devices 120, 120', 120". It has been understood, in general, that the degradation performed by the DP master device 100 is advantageous rather than the reception of two different streams from the CP 50.

FIG. 1*b* refers to an example in which, in order to perform the second policy, the DP master device 100 transmits a request 72 to the content provider 50, and receives the notification 73 (which can be optional), commanding the adoption of the second policy. Notably, the stream 55 is still being transmitted by the content provider 50 at a high resolution even after the entrance of the new DP client device 120 in the local connection 60.

The command in the notification 73 from the content provider 50 to the DP master device 100 may include in principle a binary information discriminating between the first policy and the second policy: the binary information (e.g., ideally encoded in one single bit) may have a first value in case the content provider 50 decides for the first policy, and a second value (different from the first value) in case the content provider 50 decides for the second policy. At the reception of the notification 73, the DP master device 100 will therefore be instructed on the policy to be taken. However, in some other cases, the notification 73 includes a binary information, e.g. when the policy to be adopted is chosen among a set of options including a number of options (which include the first and second policies).

In other cases, the policy to be adopted is determined by the DP master device 100 (e.g., on the basis of options previously indicated by the content provider 50).

As explained above, the choice between the first policy and the second policy may be based on a criteria based, for example, on the status of the congestion of the remote connection 52: a highly congested remote connection 52 will cause the content provider 50 to preferentially opt for the first policy, while a comparatively low congested remote connection 52 will cause the content provider 50 to preferentially opt for the second policy. In addition or alternative, the choice between the first policy and the second policy may be based, for example, on a criteria based on the reliability of the remote connection 52 (e.g., as measured by metrics, such as the number of incorrectly received packets, e.g., using a cyclic redundancy check, CRC, technique). A highly reliable status of the remote connection 52 will cause the content provider 50 to preferentially opt for the second policy, and a comparatively low reliable status of the remote connection 52 will cause the content provider 50 to preferentially opt for the first policy.

In other examples, the choice between the first policy and the second policy may be based on a criteria based, for example, on the status of the congestion of the local connection 60: if the local connection is highly congested or low reliable, then it is possible to preferentially opt for the second policy, if the local connection is comparatively low congested, then it is possible to preferentially opt for the first policy. In some examples, both a criteria based on the status of the remote connection and a criteria based on the status of the local connection may be evaluated, so as to opt for a policy after having evaluated both the status of the local connection and the status of the remote connection.

In some cases (e.g. in the examples in which it is the CP 50 which decides among the policies and adopts at least a criteria based on the status of the remote connection 52), information on the status of the remote connection 52 may be provided by the CP 50 to the DP master device 100 and is decided by the DP master device 100; in other cases (e.g. in the examples in which it is the CP 50 which decides among the policies and adopts a criteria based on the status of the local connection 60), information on the status of the local connection 60 may be provided by the DP master device 100 to the CP 50 and is decided by the DP 50.

In some examples, a hybrid criteria, based on multiple parameters (e.g., including at least one or both the reliability and the congestion, either at the local connection 60, at the remote connection 52, or at both the local connection 60 and the remote connection 52 or other parameters) may be used.

In general terms, a multiplicity of criteria may be used. For example, a first criteria may be based on a first parameter, while the second criteria may be based on a second parameter: the first criteria may assign a score (e.g., a particular amount of points) and the second criteria may also assign a score (e.g., a particular amount of points). Hence, at the end, it will be decided whether to choose the first policy or the second policy, for example, by measuring the final score obtained by summing (e.g. by addition) the scores obtained from the first criterion and the second criterion. A threshold may be compared, so that, if the resulting score (e.g., rating) is over the threshold, one particular policy is chosen, and when the resulting score (rating) is under the particular threshold, then another policy is chosen. Therefore, each criteria permits to preferentially adopt one particular policy even though, in the case of evaluation of multiple criteria, another policy may be chosen (e.g., because the scores assigned by a one or more different criteria overwhelm the scores assigned by the particular criteria).

The criteria discussed above may also be used for performing a selection among policies different from the first and the second policy Optionally, a third policy (shown in FIG. 1*c*) can be adopted. In some examples the third policy is chosen in case the new DP client device 120 has no authorization at all. Here, at the verification that the new DP client device 120 has not the same level of security than the other two DP client devices 120' and 120", the new DP client device 120 may be excluded from the local connection 60. For example, the DP master device 100 may transmit, to the new DP client device 120, a notification 74 of access denied.

In some examples, the selection of this third policy may be commanded (e.g. through notification 73) by the content provider 50 after a request 72 from the DP master device 100 to the content provider 50.

Summarizing, it may be appreciated that, when multiple DP clients 120, 120', 120" are present in the same environment (e.g., vehicle), it is possible to perform one of the policies above or select between at least a first policy (according to which the stream 56 is provided at low resolution as in FIG. 1*a*) and a second policy (according to which the degradation is performed at a local level and only for the DP client device 120 which needs to be fed with the low resolution stream 56).

The content provider 50 or the DP master device 100 may decide according to specific criteria when selecting among the policy to be adopted. For example, in some cases the content provider 50 or the DP master device 100 may base its decisions on the band at its disposal (and all the measured congestion) or on other criteria. In some cases, the DP master device 100 may suggest (e.g. in request 72) a particular policy, and the content provider 50 may select among confirming the suggestion and commanding a different policy in the notification 73.

Notably, it is also possible that the high quality stream 55 as provided to the DP client devices is encrypted, while the low quality stream 56 is not encrypted (or encrypted with a less secure encryption technique): hence, in some cases any generic DP client device is capable to actually receive the low quality stream 56 transmitted in the local connection 60.

Figure 2A:
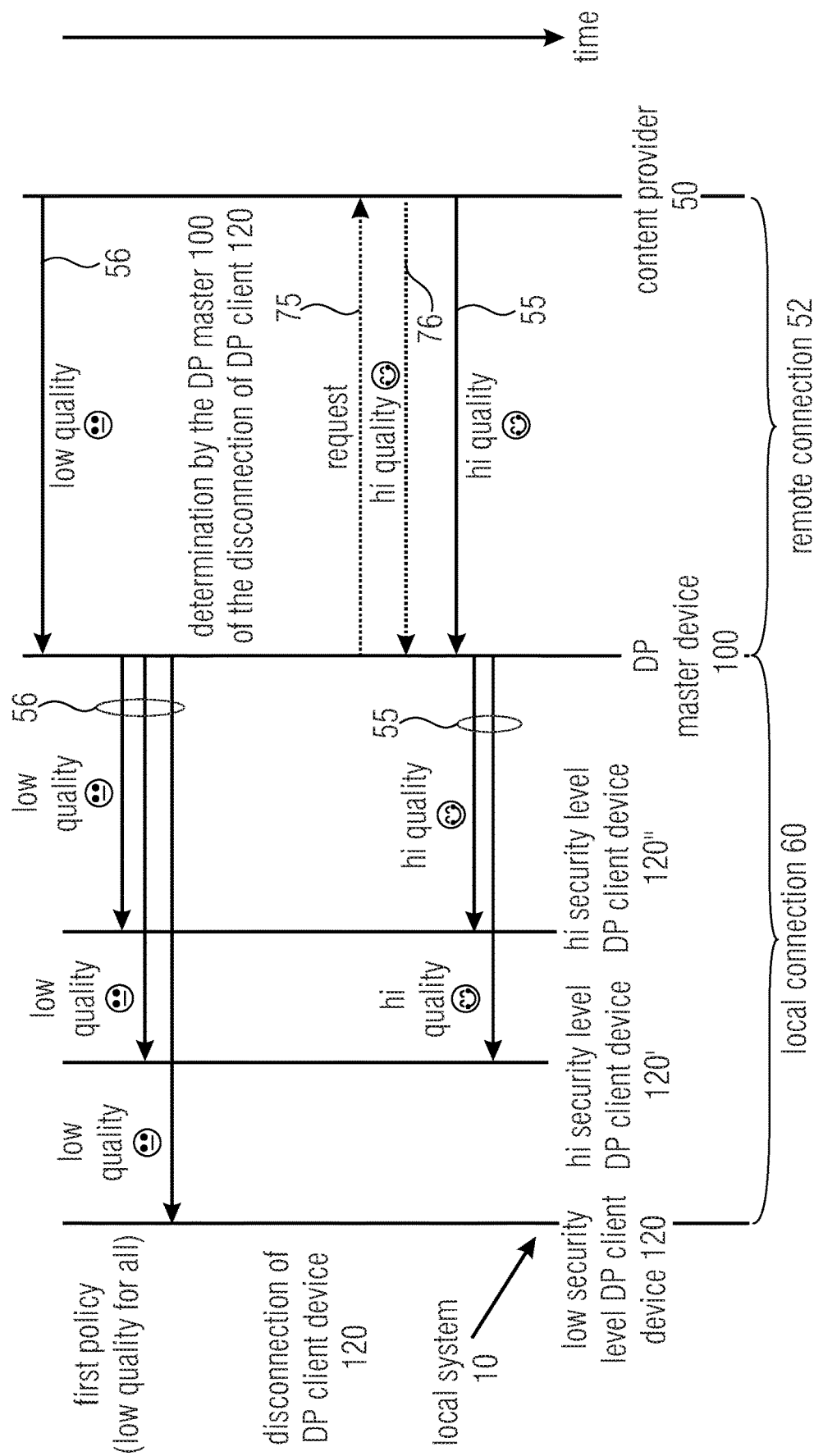
Figure 2B:
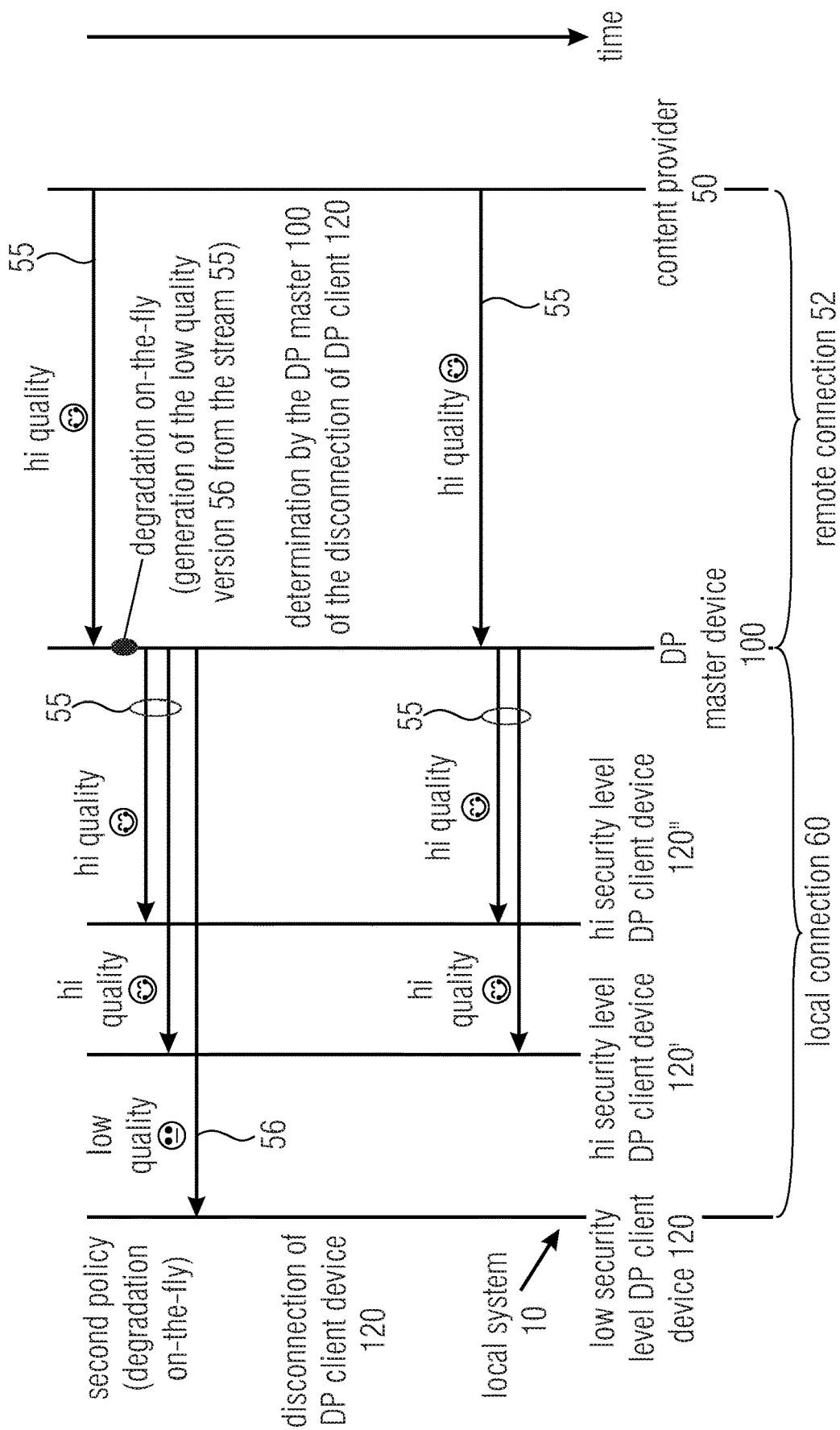

FIGS. 2a and 2b show the scenarios of the policies in case of subsequent disconnection of the low security level DP client device 120 (now indicated as "low security level DP client") from the local connection 60, leaving in the local connection 62 only the high security level DP client devices 120' and 120".

In the particular case of the first policy ("low quality for all", FIG. 2a), when the DP master device 100 determines the disconnection of the low security level DP client 120 from the local connection 60 (or determines that all the remaining client devices 120' and 120" have a level of security associated to a higher quality than the quality currently provided), the DP master device 100 may transmit a request 75 to the content provider 50 for an increased quality (e.g., increased resolution). The content provider 50 may transmit a notification 76 indicating the increase of quality. The content provider 50 may start transmitting the stream 55 at high quality (e.g., high resolution).

In the particular case of the second policy ("degradation on-the-fly", FIG. 2b), when the DP master device 100 determines the disconnection of the low security level DP client 120 (or determines that all the remaining, high security level client devices 120' and 120" have a level of security associated to a higher quality than the quality currently provided), the DP master device 100 may refrain from on-the-fly degrading the stream 55, hence continuing to feed all the remaining, high security level client devices 120' and 120" with the high quality stream 55 without generating the low quality version 56 of the stream received from the content provider 50. In theory, in this particular scenario no notification needs to be given to the content provider 50. In some examples, however, the DP master device 100 may inform the content provider 50 of the new situation.

It is here briefly discussed a technique that can be adopted by the DP master device 100 to determine the disconnection of a DP client device. The local connection 60 may state that the DP client devices 120, 120', 120" provide some form of transmission from the DP client devices 120, 120', 120" showing that they are still active (e.g., heartbeat signals, acknowledgment signals, etc., this signal not being shown in the figures). From the absence of any transmission from a particular DP client device 100 for a time period longer than a predetermined timeout threshold, the DP master device 100 may determine the disconnection of a device.

Figure 4:
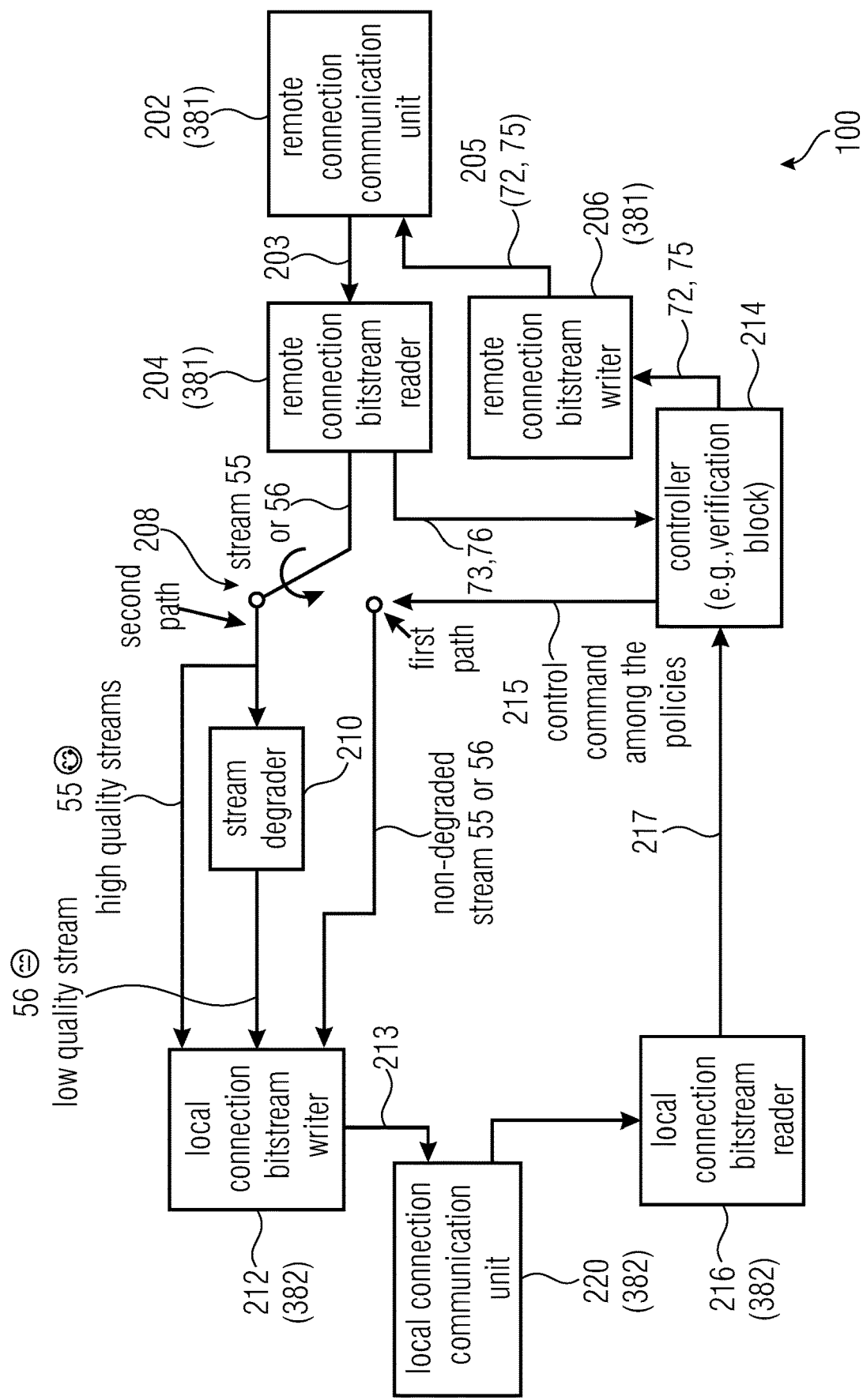
FIG. 4 shows a DP master device according to an example.

FIG. 4 shows an example of the DP master device 100, which may be the same of the DP master device 100 of FIGS. 1a-2b.

The DP master device 100 may communicate with the content provider 50 through a remote connection communication unit 202, which may permit the communication in the remote connection 52 e.g., through an antenna, a router, a modem, etc. The remote connection communication unit 202 may therefore, e.g., operate communications through mobile phone protocols and/or fixed-telephone protocols. The DP master device 100 may include a remote connection bitstream reader 204 for reading bitstreams 203 from the remote connection 52, and a remote connection bitstream writer 206, for writing bitstreams 205 towards the remote connection 52. Examples of bitstream 203 read by the remote connection bitstream reader 204 may include the stream 55 or 56, which arrives from the content provider 50, or the notification 73 or 76. Examples of bitstreams 205 written by the remote connection bitstream writer 206 include the requests 72 and 75 to be transmitted to the content provider 50.

The DP master device 100 may communicate with the DP client devices 120-120" through a local connection communication unit 220, which may permit the communication in the local connection 60. The DP master device 100 may include a local connection bitstream reader 216 for reading bitstreams 217 from the local connection 60, and/or a local connection bitstream writer 212, for writing bitstreams 213 onto the local connection 60. Examples of bitstreams 217 read by the local connection bitstream reader 216 may include acknowledgements (e.g. heartbeats) from the DP client devices 120-120" and/or the request 71 for joining the local connection 71. Examples of bitstreams 213 written by the local connection bitstream writer 216 may include the streams 55 and 56, and/or the notification 74 of access denied, for example (and, in some cases, also a beacon packet, see below).

The DP master device 100 may adopt the first policy, the second policy, and/or the third policy in accordance to the levels of security of the different DP client devices 120-120". The DP master device 100 is here represented as including a controller 214 which selects (e.g., under the command of the content provider 50) among the policies. The controller 214 may exchange messages (e.g., providing information like 72, 73, 75, 76, etc.) with the content provider 50. The controller 214 may determine the presence/absence and the level of security of the DP client devices 120-120". The controller 214 is shown in FIG. 4 as controlling (e.g. through an internal control command 215) a switch 208 which can deviate the flow of the bitstream (including the stream 55 or 56 as received from the remote content provider 50) among two different paths:

In the first path (embodying the first policy of FIG. 1a), the stream 55 or 56 (in its undegraded form, i.e. as obtained from the content provider 50) is simply retransmitted (e.g., through the local connection bitstream writer 212) to all the DP client devices 120-120";

In the second path (embodying the second policy of FIG. 1b), the high quality stream 55 (as received from the remote content provider 50) is both retransmitted in the local connection 60 (through the local bitstream writer 212), and also provided to a stream degrader 210, which generates a degraded version 56 of the stream 55 (e.g. by lowering the resolution, introducing noise, etc.), to be also transmitted in the local connection 60 (through the local bitstream writer 212).

The third policy (where implemented) is obtained by simply preventing the non-authorized DP client device 120 from joining the local connection.

The first path may also be used when all the DP client devices share the same level of security.

The stream degrader 210 may degrade the obtained stream 55, e.g. by reducing the resolution, by introducing noise, etc. the degradation may be performed either at the stream level (e.g., while the signal is still compressed), or at the signal level (e.g., when the signal is uncompressed, e.g., after a decoding and before a new recompression). The degradation may be performed, notwithstanding, downstream to the decryption of the stream. If the degradation is performed at the signal level, then a new encoding (e.g., compression) is performed (but in some cases, the re-encryption is not necessary for the degraded stream).

FIG. 4 does not show that in some examples, while some streams are degraded, some other streams may also not be subjected to variation of the quality: in some cases, FIG. 4 only refers to the video stream, while the audio stream is provided to the DP client devices as it is received from the content provider 50.

For simplicity, FIG. 4 does not show elements associated to the encryption and description of the streams 55, 56. These operations may be considered to be performed, for example, by any of the elements 204, 206, 212, 216 and/or by encryptor or decryptor not shown. In some cases, the local low quality stream 56 as provided through the local connection may be non-encrypted, while the high quality stream 55 may be encrypted.

FIG. 4 also does not show encoder and/or decoders. For example, the media stream 55 in high quality may be degraded by the stream degrader 210 downstream to a media decoder (not shown in FIG. 4). Analogously, the degraded stream 56 may obtained by encoding the output of the stream degrader 210 at an encoder (not shown in FIG. 4) downstream to the stream degrader 210 and upstream to the local connection bitstream writer.

In FIG. 4 there is not shown clock signal and synchronization strategies for the sake of simplicity.

At least some of the elements shown in FIG. 4 can be implemented in digital electronic circuitry. Some of the elements may also coexist in the same hardware device. Some of the elements may be implemented by procedures performed by a processor. FIG. 4 may therefore also be understood as representing functional operations carried out by a processor (controller) which executes instructions stored in a non-transitory memory unit.

In the example of FIG. 4, the local connection communication unit 220 and the remote connection communication unit 202 may be part of a communication interface (in some examples, the communication interface may include elements 204, 206, 212, and 216). The controller 214 may control other elements. The controller 214 may be a verification block which verifies the level of security of a generic DP client device.

An example is provided in the following flow of operations:
1. A particular local system 10 consists of HU (DP master device 100), RSU (e.g. high security level DP client device 120') and a number of potential BYOD devices (e.g., DP client devices, such as the low level of security client device 120 and the high level of security device 120").
2. HU 100 plays content e.g. compliant with Widevine L1 (or EME equivalent: in general, highest security level needing crypto and decode/display to be protected).
3. Various devices (e.g. 120) join the DP session (supported by the local connection 60), and first thing to be done is validate security level of each device (e.g. 120, 120").
4. If the security level of DP client devices matches the minimum level prescribed by the master source, secure DP proceeds as usual (e.g., all the DP client devices will have the high quality stream 55)
5. If the security level of a new DP client device (e.g., 120 in FIGS. 1a and 1b) is lower than the minimum level prescribed by the master source, there is deployed one of the following strategies (policies):
    a. If the content provider 50 allows (e.g. through notification 73), the signal 55 is degraded on-the-fly (by re-encoding to lower resolution) and such contents delivered to the target device 120 with lower security (three may be a compensation for the encoder delay in all other high security devices 120' and 120"), hence adopting the second policy.
    b. If the content provider 50 (e.g. through notification 73) does not allow to do degradation, it may be signalled (e.g. to the application) to switch to stream licensed to aggregate minimum security level of the DP session.
        i. If the content provider 50 responds (e.g. in notification 73) with permission, there is continued to stream in lower quality to all devices 120-120", matching the security level of the lowest secure device 120 (i.e., first policy).
        ii. If the provider responds (e.g. in notification 73) with no permission, the newly joined DP client device 120 is rejected with the message (in the notification 74) that DP client device 120 cannot join the session (through the local connection 60) due to insufficient capabilities (third policy, as in FIG. 1c).
6. When the DP client device 120 leaves the DP session, there is checked if the aggregate minimum security level is still the same—if not:
    a. The signal degradation is disabled, if it was permitted by step 5a
    b. It is signalled to the content provider 50 to increase the stream quality, matching new increased security level of the system (where supported).

It is noted that the present examples allow an uninterrupted playback: when a device 120 with low level of security joins the local connection 60, then the other devices 120' and 120" will either continue seamlessly receiving the stream at the intended quality (second policy) or will simply experience a real time graceful degradation of the quality, but will not experience a service interruption. Further, when the device 120 with low level of security leaves, the other devices 120' and 120" will either remain with the high quality (second policy) of will seamlessly return to their original high quality (first policy).

An example is, if permitted by the Content Service Provider 50, to create a second degraded Stream 56 and transmit this stream 56 with lower protection separately from the high quality stream 55 (for example no HDCP, but if allowed by Content Service Provider e.g. for Widevine Level 3 non-encrypted stream)—then the device can pick up the stream that fits the security.

HU=Head unit
RSU=Rear Seat unit
BYOD=Bring-your-own-device like tablet
DP=Distributed Playback (this is mirroring, it ensures lib sync playback of the same stream on multiple devices), such as the Cinemo DP, by Cinemo GmBH.

All ideas are advantageous for mirroring the stream on more than one device.

In some examples, at the DP master device, at least one of the DP client devices and/or at both, the hardware may be subdivided between (e.g. partitioned into) a trusted environment (also indicated as a "trusted execution environment", TEE) and a non-trusted environment (also indicated as "rich execution environment"). The trusted environment has a level of security which is greater than the level of security of the non-trusted environment. For example, in case of the trusted environment being part of the DP master device 100, the stream degrader 210, a decryptor 383 and/or an encryptor 389 may be part of the trusted environment. Accordingly, the decryption, encryption and degradation of the media stream may be uniquely or prevalently performed at the trusted environment, hence minimizing the possibility of spoofing media content illegally. Additionally or alternatively, at a DP client device 120', 120" with high level of security, at least a decryptor may be internal to the trusted environment, while a DP client device 120 with low level of security may have no trusted environment. In some examples (e.g., when operating according to the second policy), the DP client devices 120', 120" with high level of security may be awarded of the receiving stream 55 in high quality which is however encrypted, while the DP client devices 120 with low level of security may be awarded of receiving the stream 56 in low quality which may be notwithstanding non-encrypted (or encrypted with a less secure standard than the standard at which the stream 55 in high quality is encrypted).

As explained above, the media streams (encrypted or decrypted) 55, 56 may be audio streams, video streams, or both audio and video streams. It is not necessary that both, the audio stream and the media stream, are subjected to the same processing. For example, only some media streams (e.g. the video streams) may be decrypted, degraded, and re-encrypted by the DP master device 100. In some cases, for example, the audio stream could be in plain text at the remote connection 52 and/or at the local connection 60, while the encrypting/decrypting could only interest the video stream. The same could occur at DP client devices.

Where the DP master device 100 or the DP client device 120', 120" with a high level of security is divided between a trusted environment and a non-trusted environment, it may be that the audio rendering (e.g., at least one of audio decoding and audio playing back) is performed at the non-trusted environment, while the encrypting and/or decrypting of the audio streams can actually be processed at the trusted environment. In addiion or alternatively, the video rendering (video rendering and/or audio rendering) may be performed at the trusted environment, e.g. together with the encrypting and/or decrypting of the video stream, while the vide stream may only exist, out of the trusted environment, only in encrypted form.

The local connection 60 may be a mirroring connection. The local connection 60 may be a synchronized local connection, so that all the DP client devices 120, 120', 120" receive, (if needed) decrypt, decode and render the data stream at the same time. In this way, it is possible to provide the media content (e.g., reproduce sounds, display videos, etc.) synchronously in the different loudspeakers disseminated in the environment.

In general terms, the DP master device 100 may receive streams 55, 56 from the CP 50. The CP 50 may be understood as a remote entity which provides (e.g. on demand) streams to the DP master device 100. The remote connection 52 may be based on a digital remote communication network (the remote connection 52 may be the same of the remote connection 501 above).

In examples described above, devices (e.g., DP master device 100 or DP client device 120-120") are ranked according to specific levels of security. For example, the levels of security may be according to the standard Widevine (e.g., L1 being the maximum level of security, L2 being a level of security lower than L1, L3 being a level of security lower than L2, L4 being a level of security lower than L4).

As explain above, it may be possible to discriminate between trusted environments and non-trusted environments: the trusted environments have higher level of security than non-trusted environments. A single device may encompass, therewithin, both a non-trusted environment (from which it is admitted that some signal is maliciously obtained) and a trusted environment. While it may be admitted that at a non-trusted environment some signal could be maliciously obtained, it is excluded (at least to a reasonable level of certainty) that from the trusted environment a media signal could be maliciously obtained.

Streams encrypted by devices with higher level of security may have a higher level of security than streams encrypted by devices with lower level of security.

Also the connections (e.g., the remote connection 52 and the local connection 60) may have different levels of security. A connection in which exchanged streams are encrypted by a highly-secure device will have higher levels of security than connections in which streams are exchanged which have lower level of security.

Moreover, also certified electronic units (e.g., some certified environments, which may e.g. constitute trusted environments of the DP client devices and/or of the DP master device) may be understood as having a level of security higher than the non-certified units.

In general terms, the level of security of each device, stream, connection, environment, etc. may be associated with the particular techniques which are implemented for avoiding the malicious reception and/or decoding of the stream transmitted by the DP master device 100. The more the effort is needed for spoofing a stream, the higher the level of security of the device, channel, stream, connection, environment, etc.

In view of the above, the DP client device 100 may establish a protected remote connection 52 with a remote content provider 50, and receive a media stream from the remote content provider 50. The media stream may be encrypted according to a first encryption standard (e.g., Widevine L3). The DP master device 100 may internally decrypt the encoded media stream received from the remote content provider 50 to generate a decrypted media stream. The DP master device 100 may (in some cases) internally re-encrypt the decrypted media stream, e.g. by using a second encryption standard different from the first encryption standard (the second standard may be compliant to a greater number of DP client devices). The second encryption standard may be, in some examples, a different encryption standard from the first encryption standard (e.g., it may be HDCP). In other examples, however, the second encryption standard may be the same of the first encryption standard. In other examples, the decrypted stream may be simply relayed to DP client devices without being re-encrypted. In some examples, (e.g., when the second policy is adopted) between the decryption and the encryption (and maybe between a decoding downstream to the decryption and an encoding upstream to the encryption) a degradation may be performed (e.g., by stream degrader 210), to obtain the media stream 56 in low quality. In some examples, the degradation may be bypassed, so as to simply retransmit the media stream 55 in high quality to the DP client devices 120' and 120" (in some cases, at least one of the decryption/re-encryption and decoding/re-decoding may be skipped).

After having internally re-encrypted the media stream (e.g. to obtain the media stream 56 in low quality), the DP server device 100 may transmit the re-encrypted, degraded stream 56 to low security level DP client device 120, and send the non-degraded stream 55 to the high security level DP client devices 120' and 120".

In some examples, the DP master device 100 may also comprise a media renderer 540, which may comprise at least one of internal audio decoder(s) 384, internal video decoder(s) 385, embedded speaker(s) or (connections to external speakers) 391, embedded display(s) 392 and a video decoder controller 388 controlling the trusted internal video decoder(s) through a control signal 385'.

In this example, the DP master device 100 is subdivided (partitioned) into a trusted environment 380 and a non-trusted environment 360. Both the environments 380 and 360 may coexist within the same hardware device, e.g. confined within the same internal equipment (e.g., within the same housing). The environments 380 and 360 may be, for example, placed in two different boards stably or fixedly connected to each other and/or to other elements of the same hardware components (e.g. the housing). The environments 380 and 360 may be associated to different portions of the DP master device 300. For example, the environments 360 and 380 may be supplied by the same power supply. Alternatively or in addition, the environments 360 and 380 may have the same ground connection or reference connection. Alternatively or in addition, the environments 360 and 380 may be connected to the same internal clock. Alternatively or in addition, the environment 360 and 380 are not necessarily electromagnetically insulated from each other. The media renderer 540 may be partitioned in one first trusted portion (e.g. formed by the video decoder(s) 385 and the embedded display(s) 392) in the trusted environment 380) and a non-trusted portion (e.g. formed by the audio decoder(s) 384 and the embedded speaker(s) or connections to external speakers 391). The trusted environment 380 may be sealed.

The trusted environment 380 has a level of security that is higher than the non-trusted environment 360. This does not mean that the non-trusted environment 360 is necessarily completely unprotected: however, that the effort for illegally gaining the access to the multimedia content in the trusted environment 380 (or to illegally decrypt a stream generated in the environment 380) is much higher than the effort for illegally obtaining multimedia content from the non-trusted environment 360 (or to illegally decrypt a stream generated in the non-trusted environment 360). The trusted environment 380 may be, for example, a certified environment. In some cases, the trusted environment 380 may be capable of decrypting or encrypting a stream according to a Widevine encryption standard. The trusted environment 380 may re-encrypt the decrypted stream by using a second encryption standard (e.g., HDCP). The trusted environment 380 may, for example, decode the video stream and/or display the decoded video signal. In examples, the audio streams may be either directly decoded by the non-trusted environment 360 or may be decoded by the trusted environment 380 and provided to the audio decoder 384, e.g. within the non-trusted environment 360. The stream 55, once decrypted, may be re-encrypted in the trusted environment 380 according to the second standard (e.g., after having been degraded) and may be retransmitted to the high security level client devices 120', 120" in the second encryption standard, and to the low security level client devices 120, e.g. in plaintext, in its low-quality version 56, after degradation.

Figure 3A:
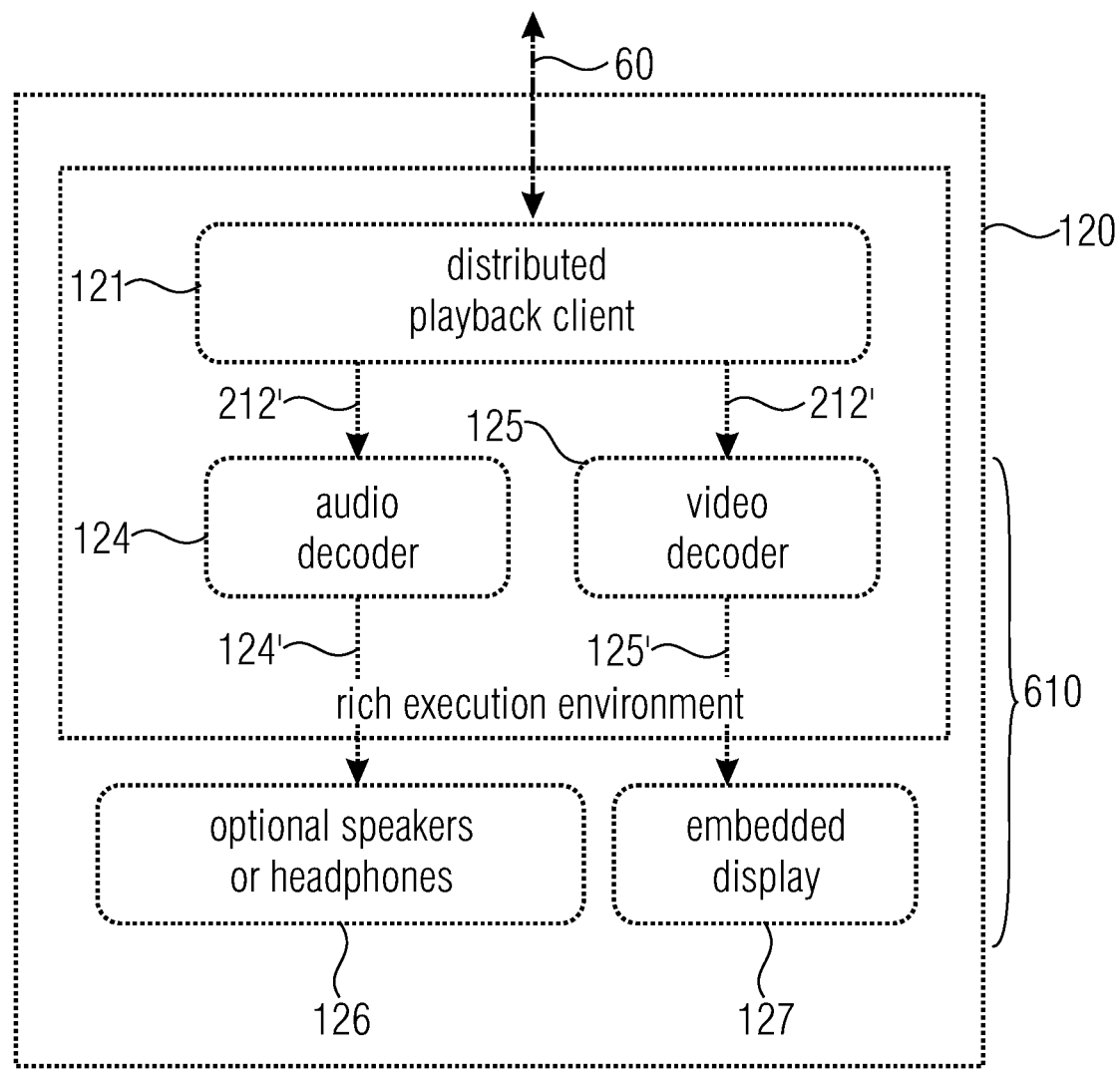
FIGS. 3a and 3b show distributed playback, DP, devices according to examples.
Figure 3B:
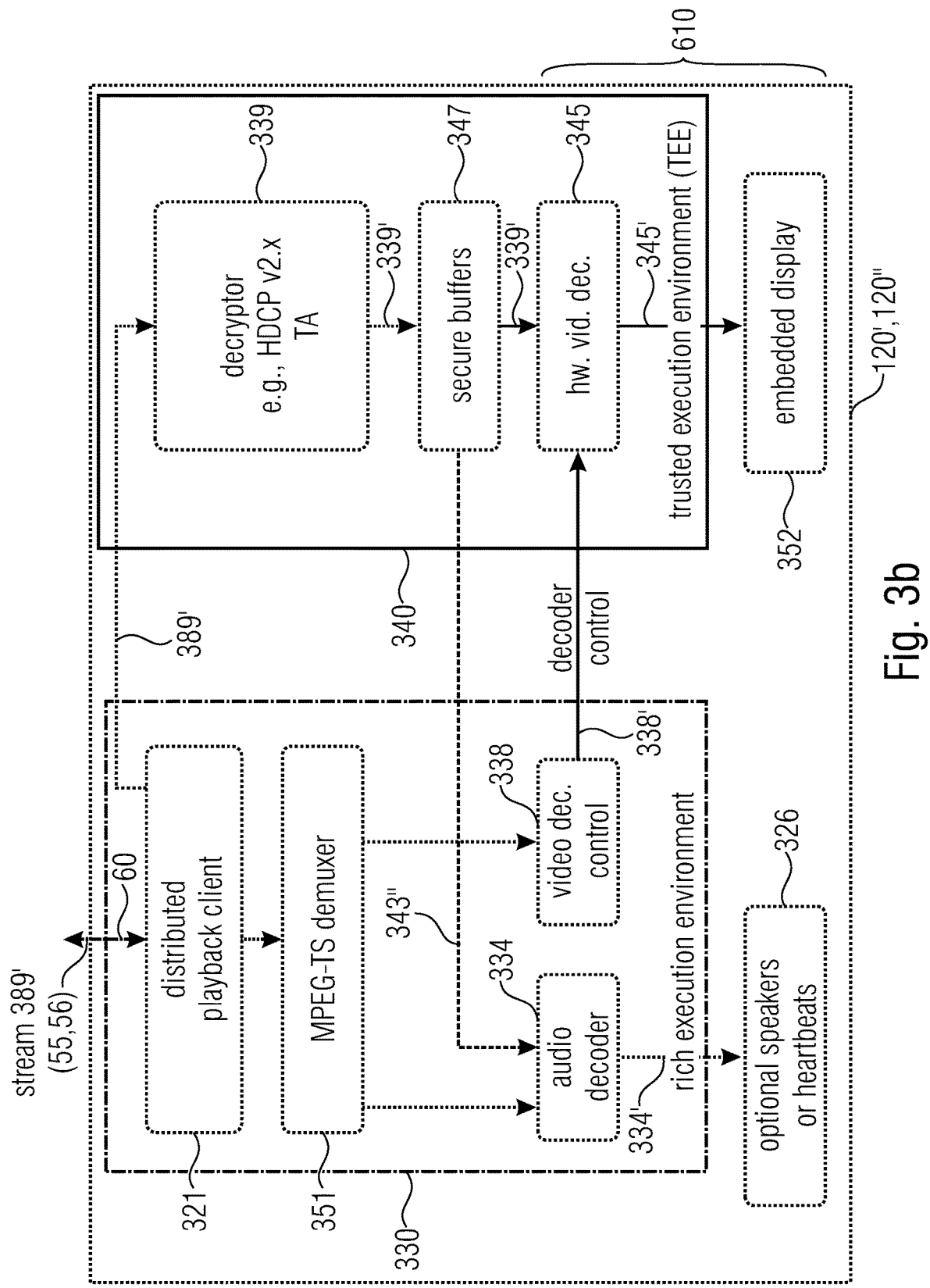

As shown in FIG. 3b, at least one of the high security level DP client devices 120', 120" may be in turn partitioned between a trusted environment 340 and a non-trusted environment 330. The trusted environment 340 may be used, for example, for decrypting the obtained encrypted media streams 55 in high quality, or to control the display of the decrypted signals in the trusted environment 340 (while the audio stream, may also be decoded in the non-trusted environment 330 in some examples).

Figure 3C:
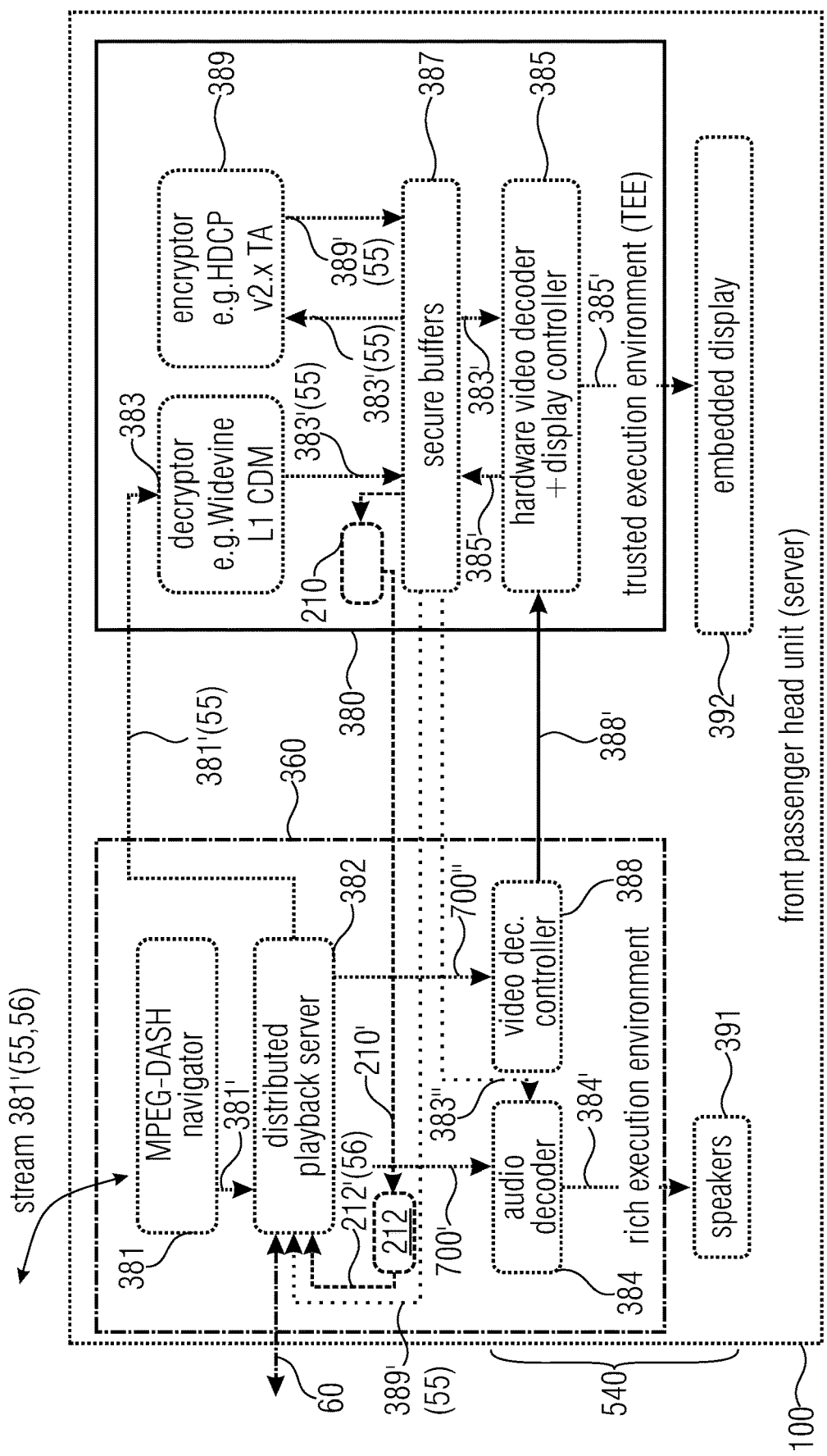
FIG. 3c shows a DP master device according to an example.

It may be appreciated that, in the example of FIGS. 3b-3c, the video streams 55 in high quality, when decrypted, do not exit the trusted environment, or at least are not fed back to the non-trusted environment. Even when the stream 55 passes through a non-trusted environment, it is notwithstanding encrypted. Accordingly, it is virtually never possible to illegally arrive to the multimedia content, neither by illegally decoding the encrypted stream, nor by entering into the hardware of the trusted environment 380.

With reference to FIG. 3c, the DP master device 100 may receive an encrypted media stream 381' (which may be either a high quality version 55 or a low quality 56, e.g. according to the chosen policy) from the CP 50 through the remote connection 52. The stream 381' (55, 56) received from the CP 50 may be in encrypted, by the CP 50, according to a first encryption standard (e.g., Widevine, e.g., L1). The encrypted stream 381' may be received by a navigator 381 (which may be part of the communication interface of the DP master device 100, and may implement at least one of elements 202, 204, and 206 of FIG. 4). The navigator 381 may be positioned in the non-trusted environment 360. The navigator 381 may provide the encrypted stream 381' as received from the content provider 50 to a DP server 382 or other units of the DP master device 300. The navigator 381 and the DP server 382 may be or implement at least a part of the communication interface (e.g., the navigator 381 and the DP server 382). The DP server 382 may lack encryption/decryption and encoding/decoding capabilities. The DP server 382 may be in the non-trusted environment 360. The DP server 382 may provide the stream 381' (encrypted according to the first encryption standard, e.g. Widevine) to the trusted environment 380. The stream 381' may bere be the stream 55 in high quality.

Internally within the trusted environment 380, a decryptor 383 (e.g. Widevine L1 decryptor) may decrypt the encrypted stream 381' to obtain a decrypted stream 383'. The decrypted stream 383' may be provided, without exiting from the trusted environment 380, to a trusted decoder 385, to obtain a video signal 385'. The decoded video signal 385' may be provided to the embedded display 392, for example. The decoded video signal 385' may be provided to the degrader 210 e.g., when the second policy is adopted, to obtain a degraded signal 210' in lower quality than the decoded video signal 385'. The degraded signal 210' may be provided to a encoder 212, which may provide a low quality stream 212' (which may be an example of the media stream 56 in low quality as degraded on the fly to be provided to the low security level client device 120 when operating according to the second policy). While it is advantageous for the degrader 210 to be in the trusted environment 380, the encoder 212 may be in the non-trusted environment 360: since the degraded video signal 210' has low value, it is not a big problem if it is illegally obtained. However, the high quality decoded video signal 385' remains in the trusted environment 380 and does not enter the non-trusted environment 360. The hardware video decoder 385 may be controlled, through a video control signal 388', by a video controller 388 (which may be in the non-trusted environment 360). Notably, the DP server 382 of FIG. 3c ma correspond to at least one of the elements 220, 212, and 216 of FIG. 4.

In parallel (e.g., when operating according to the second policy), the video stream 383' (55) in high quality and in decrypted form as obtained from the decryptor 383, may be also provided to the encryptor 389 (e.g. HDCP encryptor), to obtain a second encrypted stream 389' (which may be an example of the video stream 55 in high quality to be provided to the high security level client devices 120', 120"). Notably, the stream 389' (which may embody the stream 55 in high quality) exits from the trusted environment 380 in encrypted form, and is therefore protected. While in some examples the encryptor 383 and 389 use different standards, in other cases they make use of the same standard.

Between at least two among the decryptor 383, the encryptor 389, the trusted video decoder 385 and the degrader 210, secure buffers 387 may be provided (e.g., within the trusted environment 380 and, for example, between the decryptor 383, the encryptor 389, the video decoder 385, and the non-trusted environment 360).

From the secure buffers 387, or more in general from the trusted environment 380, the second encrypted stream 389' (55) in high quality may be provided to the DP server 382 (or more in general, to the non-trusted environment 360), e.g. to the local connection bitstream writer 212 of FIG. 4. In some cases (e.g., when the second policy is adopted) also the low quality video stream 212' is in parallel provided to the DP server 382 (e.g., in data packets sent in the local connection almost simultaneously with each other).

In examples, some particular streams (e.g., audio streams) are not necessarily re-encrypted. Therefore, from the secure environment 380, a decrypted (and unprotected) version 383" (which may be a part of the decrypted stream 383') may be directly provided, form the trusted environment 380 to a non-trusted decoder 384 (which may be an audio decoder) internal to the non-trusted environment 360. The non-trusted decoder 384 may decode the unprotected stream 383" and provide a signal (e.g., audio signal) 384' to an internal or output unit (e.g., a speaker) 391 or an output unit connected downstream to the decoder non-trusted decoder 384.

It may be advantageous that the high quality video streams (and maybe also the low quality video streams) are protected both with the first encryption (e.g., Widevine) in the remote connection 52 and with the second encryption in the local connection 60 (e.g., at least HDCP for the high quality streams). It may also be in some examples that the audio stream (or another less important stream) is provided to DP client devices in plaintext.

An example of high security level DP client device 120' or 120" is shown in FIG. 3b. The DP client device 120', 120" may be partitioned between a trusted environment 340 and a non-trusted environment 330. The separation between the trusted environment 340 and the non-trusted environment 330 may be analogous to that explained for the separation between the trusted environment 380 and trusted environment 360 of the DP master device 300, and is therefore here not repeated in too many details. It is repeated, however, that the trusted environment 340 has a level of security which is higher than the level of security of the non-trusted environment 330, and that it is more difficult (or virtually impossible) to illegally arrive to the multimedia content from the trusted environment 330. The DP client device 320 may be input with the second encrypted stream 389' (55) in high quality, e.g. originally encrypted by the encryptor 389 of the trusted environment 380 of the DP master device 100. Within the DP client non-trusted environment 330, a distributed playback client (DP client) 321 may be provided. The DP client 321 may implement, in particular, a communication interface of the DP client device 120', 120". The DP client 321 may provide the second encrypted stream 389' (55) to a DP client decryptor 339, which may be within the trusted environment 340. The second decryptor 339 may output a decrypted version 339' of the second encrypted stream 389' (55). This decrypted stream 339' (55) may be provided, e.g. through secure buffers 347 (e.g. internal to the trusted environment 340) to an internal, trusted decoder 345 (e.g. hardware video decoder). The trusted decoder 345 may provide a signal 345' (e.g. high quality video signal) to an embedded output unit 352 which is within (or associated to) the trusted environment 340. Accordingly, the decrypted stream 339' (55), in high quality, remains in the trusted environment 340 or at least does not reenter into the non-trusted environment 330, and the high quality signal 345' is only directed to the embedded output unit 352 (e.g., embedded display), without passing through the non-trusted environment 330. In general terms, the stream 339' (55) and the signal 345' can be a video stream and video signal, respectively, but in some examples, it may be either an audio stream and audio signal and/or video and audio signal and video and audio stream.

From the secure buffers 347, a decrypted stream 343" (e.g. audio stream) may be provided to the non-trusted environment 330, and in particular, to a non-trusted decoder (which may be an audio decoder) 334. From the non-trusted decoder 334, a media signal 334' (which can be an audio signal) may be provided to a speaker or headphone 326.

It is also possible to have a video decoder control 338 (e.g., in the non-trusted environment 330) outputs a control signal 338' which controls the trusted video decoder 345.

In the example of FIGS. 3b-3c, an extremely high level of security is attained: any time the stream is in decrypted form, it is either in the secure environment 380 of the DP master device 300 (500) and in the secure environment 340 of the DP client devices 320-320" (600).

The DP client device 120', 120" may be considered to include a media renderer 610, which may include at least one of trusted video decoder 345 and the embedded display 352 (in the trusted portion 340), and, in the non-trusted portion 340, an audio decoder 334, a video controller decoder 338 controlling, through a control signal 388', the trusted decoder video 345, and speakers 326 or connections thereto.

Further, any of the versions of the decrypted stream, when provided to the media renderers 540 and 610 (and in particular to the decoders 384, 385, 334, 338) result being synchronized with each other: in the DP master device 300 (500), delays may be added for both the streams rendering the audio stream 383" provided to the audio decoder 384 and the video stream 383' provided to the trusted decoder 384. The delays may be controlled by the DPI 510 which takes into account the timing of the generation of the physical signals also at DP client devices 330-330" (600).

A low security level DP client device 120 is shown in FIG. 3a. The DP client device 120 may lack decryption capabilities, or at least it does not have the capabilities for decrypting the second encrypted stream 389' (55) as provided by the DP master device 100. Hence, the DP client device 120 may only make use of the degraded media stream 212', which is non-encrypted, for example. A DP client 121 of the DP client device 120 may receive the degraded, non-encrypted stream 212'. The DP client 121 implement the communication interface of the DP client device 600. The DP client 121 may provide the non-encrypted media stream 212' to an audio decoder 124 and a video decoder 125, from which a low quality audio signal 124' and a low quality video signal 125' may be provided to speakers 126 and a display 127, respectively. The audio decoder 124, video decoder 125, speakers 126 and display 127 may be part of a DP client media renderer 610.

It is now possible to explore the behavior of the system in the local connection 60. At first (when only the high security level DP client devices 120', 120" are connected to the local connection 60), the high quality stream 55 (381') is received by the DP master device 100, e.g. at the communication interface (e.g. the navigator 381, remote connection communication unit 202). Then, the high quality stream 55 (381') is provided to the decryptor 383, and, in decrypted version 383', to the trusted decoder 385. The trusted decoder 385 provides the high quality stream 55, in decrypted version 383', to the decryptor 389, which provides the high quality stream 55 in its second encrypted version 389' (we are, in FIG. 4, with the switch 208 connecting the remote connection bitstream reader 204 to the local connection bitstream writer 212 with the degrader 210 being deactivated). The second encrypted stream 389' (55) is then sent, through the local connection 60, to the high security level DP client devices 120', 120". Each DP client device 120', 120" receives the encrypted high quality stream 389' (55) at the DP client 121, and decrypts the high quality stream 389' (55) at the DP client decryptor 339, to obtain a decrypted version 339' of the high quality stream 55. Then, the decrypted high quality stream 339' is provided to the DP client renderer 610, which renders the high quality video and audio.

When the low security level DP client device 120 requests (71) to enter in the local connection 60, it may be decided (e.g., by the CP 50 or the DP master device 100), whether to follow the first policy (FIG. 1a) or the second policy (FIG. 1b).

If the first policy is chosen, then the stream 381' as obtained by the DP master device 100 from the CP 50 is in low quality (stream 56). In some examples, this implies that it is not necessary to decrypt the received stream 381', and the decryptor 383 may be bypassed (bypass not shown). In other cases, the stream 381' (56) as received from the CP 50 may be decrypted, by the decryptor 383, but its decrypted version 383' may be directly fed to the DP server 382 (i.e., the decrypted stream 383' passes from the buffers 387 to the DP server 382 and, in FIG. 4, the switch 208 connects directly the remote connection bitstream reader 204 to the local connection bitstream writer 212). The non-encrypted stream 56 may then be sent through the connection 60 to all the DP client devices 120-120", each of them may render the non-encrypted stream 56 at a low quality.

If, instead, the second policy is chosen, then the stream 381' as obtained by the DP master device 100 is in high quality (stream 55). Hence, the stream 389' (55) arrives at the along the decryptor 383, and hereafter bifurcates among:
- a first branch (high quality stream 56), the encryptor 389, the local connection 60, and the high security DP client devices 120', 120";
- a second branch (low quality stream 56), along the degrader 210, the decoder 212, the local connection 60, and then the low security device 120;
- a third branch towards the renderer 540 (if provided), e.g. by providing the audio stream 383" and the video stream to the trusted video decoder 385.

The transmission of the high quality stream 55 and/or of the low quality stream 56 (which may be in the form, for example, of the encrypted stream 389' and/or of the degraded stream 212' may be packetized, e.g., by the local connection communication unit 220 or the local connection bitstream writer 212 (e.g. at the distributed playback server 382) or by a low level communication layer associated to one of these blocks, so that the data packets are transmitted to the DP client devices. The data packets (which are here not shown) may be of the type having, for example, a header data field in which signaling is provided and/or cyclic redundancy check, CRC, data are provided, and a payload data field, in which the signal, compressed in the version 55 or 56, is provided to the DP client devices.

In particular, in cases in which the second policy is adopted, the DP master device 100 may almost simultaneously (e.g. immediately one after the other one) transmit two different data packets in the local connection 60: a first data packet encoding the high quality stream 55 (389'), and a second data packet associated with the low quality stream 56 (212'). Of course, while the payload in the high quality stream 55 is in general encrypted (e.g., according to HDCP), the payload encoding the low quality stream 56 may be, according to the particular embodiment, in plain text or encrypted.

The renderers 610 of both the DP client device 120 with low level security, the DP client devices 120', 120" with high level of security and, if provided, the renderer 540 of the DP master device 100 may be synchronized with each other.

At first, the DP master device 100 may send, periodically, in the local connection 60, a beacon packet having a clock signal data field in which there is encoded the current time according to the DP client device 100. Accordingly, each DP client device may have knowledge of the time at the DP master device. There may be provided solutions for also taking into account the delay in the transmission of the beacon signal (for example, the DP client device may measure the time instant at which the beacon packet is received and add it to the time indicated in the clock signal data field in the beacon packet. Accordingly, each DP client device may resynchronize to the clock of the DP master device.

Moreover, each DP client device may transmit an acknowledgment packet in which it replies to the beacon packet. Each DP client device may also indicate, in a time stamp data field of the acknowledgement packet, the playback time which is currently rendered (e.g., an indication of which second of film is currently displayed). Accordingly, the DP master device 100 may have the knowledge of the latency impairing the playback at each DP client device. The DP master device 100 may calculate the delay of each DP client device, by keeping into account the time needed for receiving the acknowledgement packet after having transmitted the beacon packet: for example, the time delay from the DP master devices transmission of the beacon packet and the DP master device's reception of the acknowledgment packet from each DP client device may permit to estimate the actual time instant at which a particular media content (e.g. a particular photogram) is rendered by each DP client device. The latency may be estimated, for example, as the time delay for receiving the acknowledgment packet divided by two, thus inferring the latency of each DP client device. By inferring the time instant in which each device has actually rendered a particular media content, the DP master device 100 may also synchronize all the DP client devices and its internal renderer 540. For example, the DP master device 100 may indicate, in one filed in the beacon packet, also the latency of each of the DP client devices. Therefore, each DP client device will know its own latency and will resynchronize the rendering of its media content to the timing information master device. The DP master device 100 may also transmit a presentation time stamp encoded in a presentation time stamp field of the beacon packet, indicating which is the timing instant which is currently played back by the renderer 540 (or anyway, the scheduled time which the DP master device 100 wants that a particular media content is rendered). Notably, the timing is also provided, for audio and for video, to the internal media renderer 540 indicated with 700' and 700" in FIG. 3c. Notably, the DP master device may control the rendering of the media content based on the latency of the DP client devices: for example, the DP master device may reschedule the rendering of the media content base on the maximum latency among the DP client devices, so as to permit all the renderers 540 and 610 to be synchronous.

Hence, the playback of the devices of the DP client devices resulting in being synchronized to the DP master device.

Some discussion is now provided regarding the possibility in which only a low quality stream is currently provided to or a plurality of low security level DP clients (which may be like the DP client devices 120) and a high quality level DP client device (e.g., like the high security level DP client device 120' or 120") requests to be connected to the local connection 60. In one example, the low quality stream 56 is currently provided from the content provider 50 to the DP master device 100, which, in turn, relays the low quality stream 56 to the DP client devices. When the high security level DP client device enters the local connection 60, then the DP master device may request the provision of the high quality stream 55 to the CP 50. The CP 50 may, therefore, provide the high quality stream 55 to the DP master device 100 which, in turn, may provide the high quality stream to the only low security level DP client device and perform the degradation of the high quality stream 55 to obtain a low quality version 56 of the stream 55 and, subsequently, provide it to the low security level DP client devices.

Another possibility is that, at the start, when all the DP client devices are DP client devices with low security level, then the stream may be provided by the content provided by the DP master device 100 in high quality (and therefore, it would be the high quality stream 55). Notwithstanding, the DP master device will degrade the high quality stream 55 to obtain the low quality stream 56 and will transmit the low quality stream 56 to the totality of the DP client devices (which are all low security level DP client devices). At the very moment in which a security level DP client device enters the local connection 60, the DP master device 100 will promptly provide the high quality stream 55 to the high security level DP client device, while seamlessly maintaining the degraded low quality stream 56 for the preexisting low security level DP client devices.

It is also noted that FIG. 3c shows as operating the degradation at the degrader 210 at the signal level (e.g., when the signal 385' is already decompressed after the decoding of the decrypted stream 383'). Therefore, it is shown that an encoder 212 encodes the degraded signal 210' as provided by the degrader 210. However, in other examples, the degrader 210 may directly degrade the decrypted stream 383' before the stream is decompressed. Therefore, the input of the degrader 210 may be the decrypted stream 383', and its output may be directly provided as low quality stream 56 to the distributed playback server 382.

In general terms, the examples above have been explained as mostly in the sense that there are only two levels of security and two levels of quality. Notwithstanding, more general examples (e.g., with more than two qualities and more than two levels of security) may be defined. In some cases, the degrader 210 may degrade the high quality stream 55 according to at least two different degradation levels, so as to provide more than two levels of quality for the more than two client devices. In another example, even though there are more than two levels of security, only two levels of quality are provided. Hence, in some examples, when the first policy is adopted, all the devices take the quality of the lowest security device and, when the second policy is adopted, all the highest security level devices have the highest quality and the other devices have the lowest quality. Several degrees and gradation can be implemented.

Examples above are per se examples which may be adapted to a device and/or to a method. An example of method is provided hereinbelow:
receiving a stream (55) at a first quality from a remote content provider (50);
transmitting, through a local connection (60), the media stream (55, 56) to the plurality of DP client devices (120, 120', 120").

The method may include selecting among a plurality of policies including the first policy and the second policy. Selecting includes determining whether the level of security is the same for the all the DP client devices (120, 120', 120").

With reference to FIGS. 1a and 1b, it is possible to see that there is obtained a distributed playback, DP, master device (e.g. 100) for transmitting media stream (e.g. 55) to a plurality of DP client devices (e.g. 120, 102', 120"), the media stream (e.g. 55) being at a quality selectable between a first (high) quality and a second quality lower than the first quality, the DP master device (e.g. 100) being configured to:
establish a local connection (e.g. 60) with at least one first DP client device (e.g. 120', 120");
establish a remote connection (e.g. 55) with a remote content provider, CP (e.g. 50), to receive the media stream (e.g. 55) at the first quality from the remote CP (e.g. 50);
perform a transmission, through the local connection (e.g. 60), of the media stream (e.g. 55) at the first quality to the at least one first DP client device (e.g. 120', 120"), the at least one first DP client device (e.g. 120', 120") having a first level of security;
receive a request (e.g. 71) for connection from a second DP client device (e.g. 120), the second DP client device (e.g. 120) having a second level of security;
verify the second level of security of the second DP client device (e.g. 120);
in case of verification that the second level of security is the first level of security or higher, to establish the local connection (e.g. 60) also with the second DP client device (e.g. 120) and transmit, through the local connection (e.g. 60), the media stream (e.g. 55) at the first quality to both the first DP client device (e.g. 120', 120") and the second DP client device (e.g. 120); and
in case of verification that the second level of security is associated to the second quality level or lower, to perform a selection (e.g. 208, 215) among a plurality of policies including a first policy and a second policy.

The DP master device (e.g. 100) may be configured, when operating according to the first policy, to:
receive, from the remote CP (e.g. 50), the media stream (e.g. 56) at the second quality; and
transmit, to both the at least one first DP client device (e.g. 120', 120") and the second DP client device (e.g. 120), the media stream (e.g. 56) at the second quality; and The DP master device (e.g. 100) may be configured, when operating according to the second policy, to:
receive, from the remote CP (e.g. 50), the media stream (e.g. 55) at the first quality;
transmit, to the at least one first DP client device (e.g. 120', 120"), the media stream (e.g. 55) at the first quality;
degrade (e.g. 210) the media stream (e.g. 55), received at the first quality, to obtain a degraded media stream (e.g. 56) at the second quality; and
transmit, to the second DP client device (e.g. 120), the degraded media stream (e.g. 56) at the second quality.

With reference to FIGS. 1a and 1b, the DP master device may be configured to determine the disconnection of the second DP client device (e.g. 120), and further configured to:

when operating according to the first policy, to transmit a request (e.g. 71) to the remote CP (e.g. 50) for receiving the media stream (e.g. 55) at the first quality, so as to subsequently receive and transmit the media stream (e.g. 55) at the first quality; and when operating according to the second policy, provide the stream (e.g. 55) at the first quality to the at least one first DP client device (e.g. 120', 120").

Even though some aspects have been described within the context of a method, it is understood that said aspects also represent a description of the corresponding device or a system, so that a block or a structural component of a device is also obtained from a corresponding method step or as a feature of a method step. Aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some examples, some or several of the most important method steps may be performed by such a device.

It is also noted that the fact of the streams being selectable among a first and a second quality could be seen, under some points of view, of choosing among two different streams encoding substantially the same media content but with different qualities. The degrader 210 may be seen as generating the low quality stream when operating at the second policy, while under the first policy the two streams at different qualities may be simply provided by the CP 50.

It is noted that the "policies" as discussed above may be considered, in examples, as being "modes of operating", "operations", "actions", "strategies", etc.

It is also noted that the operations of the DP master device and the DP client devices may be controlled by a controller (e.g., the controller 214 for the DP master device).

Depending on specific implementation requirements, examples of the present disclosure may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some examples in accordance with the preset disclosure thus comprise a data carrier which comprises electronically readable control signals that are capable of cooperating with a programmable computer system such that any of the methods described herein is performed.

Generally, examples of the present disclosure may be implemented as a computer program product having a program code, the program code being effective to perform any of the methods when the computer program product runs on a computer.

The program code may also be stored on a machine-readable carrier, for example.

Other examples include the computer program for performing any of the methods described herein, said computer program being stored on a machine-readable carrier.

In other words, an example of the inventive method thus is a computer program which has a program code for performing any of the methods described herein, when the computer program runs on a computer.

A further example of the inventive methods thus is a data carrier (or a digital storage medium or a computer-readable medium) on which the computer program for performing any of the methods described herein is recorded.

A further example of the inventive method thus is a data stream or a sequence of signals representing the computer program for performing any of the methods described herein. The data stream or the sequence of signals may be configured, for example, to be transferred via a data communication link, for example via the internet.

A further example includes a processing means, for example a computer or a programmable logic device, configured or adapted to perform any of the methods described herein.

A further example includes a computer on which the computer program for performing any of the methods described herein is installed.

A further example includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some examples, a programmable logic device (for example a field-programmable gate array, an FPGA) may be used for performing some or all of the functionalities of the methods described herein. In some examples, a field-programmable gate array may cooperate with a microprocessor to perform any of the methods described herein. Generally, the methods are performed, in some examples, by any hardware device. Said hardware device may be any universally applicable hardware such as a computer processor (CPU), or may be a hardware specific to the method, such as an ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A distributed playback, DP, master device for transmitting a media stream to a plurality of DP client devices, the DP master device comprising a communication interface adapted to:

establish a local connection with a plurality of DP client devices;

establish a remote connection with a remote content provider, CP, to receive the media stream from the remote CP;

perform, through the local connection, a transmission of the media stream to the plurality of DP client devices, wherein each DP client device is associated with a respective level of security, wherein each level of security is associated with a resolution of the media stream;

wherein the DP master device is adapted, in case the DP client devices are associated with a same level of security, to perform the transmission of the media stream through the local connection at the resolution associated with the level of security of the DP client devices, and wherein the DP master device is configured, in case the DP client devices are associated with different levels of security, to adopt a second policy, wherein, when the DP master device operates according to the second policy:

the communication interface receives, from the remote CP, the media stream at the resolution associated with the DP client device with the higher level of security;

the communication interface transmits, to the DP client devices associated with the higher level of security, the media stream at the resolution associated with the to the higher level of security;

the media stream is degraded, by reducing the resolution, to acquire a degraded media stream at the resolution associated with the lower level of security; and the communication interface transmits, to the DP client devices associated with the lower level of security, the degraded media stream, so that the media stream at the resolution associated with the DP client device with the higher level of security and the degraded media stream are transmitted simultaneously;

wherein the DP master device is further configured to:

periodically transmit, in the local connection, a beacon packet comprising a clock signal data field in which there is encoded the current time according to the DP master device, and to have knowledge of the latency impairing each of the DP client devices from an acknowledgment packet comprising a time stamp data field in which there is provided the playback time which is currently rendered by each of the DP client devices, so that the DP master device indicates, in one field of the beacon packet, the latency of each of the DP client devices.

2. The DP master device of claim 1, adapted, in case the DP client devices are associated with different levels of security, to select one policy among the second policy and a first policy so that, when operating according to the first policy, the second policy is deactivated, the second policy being alternative to the first policy, wherein the communication interface is configured, when the DP master device operates according to the first policy, to:

receive, from the remote CP, the media stream at a resolution associated with the DP client device associated with the lower level of security; and transmit, to all the DP client devices, the media stream at the resolution associated with the DP client device with the lower level of security.

3. The DP master device according to claim 2, adapted to perform a request to the CP, so as to receive from the CP the selection between the first and second policies.

4. The DP master device according to claim 2, further configured to select one policy among the first policy, the second policy, and a third policy of denying the access to the local connection to a DP client device comprising the lower level of security.

5. The DP master device according to claim 2, configured to perform the selection between the first and second policies at the reception of a request for joining the local connection from a DP client device.

6. The DP master device according to claim 2, configured to perform the choice between the first policy and the second policy is based on a criteria based on the status of the congestion of the local connection, so that, if the local connection is highly congested, then the second policy is chosen, and if the local connection is comparatively low congested, then the first policy is chosen.

7. The DP master device of claim 1, wherein the media stream provided to the DP client device with the higher level of security is encrypted, and the resolution associated with the DP client device with the lower level of security is not encrypted.

8. The DP master device of claim 1, wherein the DP client devices with the higher level of security are wired devices, and the DP client devices with the lower level of security are wireless devices.

9. The DP master device of claim 1, wherein the local connection is wired.

10. The DP master device of claim 1, wherein the local connection is wireless.

11. The DP master device of claim 1, wherein the DP master device comprises a level of security L1 according to the Widevine standard.

12. The DP master device of claim 1, wherein the DP master device is integrated in a vehicle.

13. The DP master device of claim 1, wherein the media stream is a video stream.

14. The DP master device of claim 1, wherein the media stream comprises a video stream and an audio stream, wherein the audio stream is not degraded.

15. The DP master device of claim 1, configured to refrain from degrading the stream at the determination that no DP client device with level of security lower than a predetermined threshold is present.

16. The DP master device of claim 1, further comprising a decryptor to decrypt the media stream to acquire a decrypted version of the media stream, and an encryptor to encrypt the decrypted version of the media stream, to acquire a second encrypted version of the media stream.

17. The DP master device of claim 2, further comprising a decryptor to decrypt the media stream to acquire a decrypted version of the media stream, and an encryptor to encrypt the decrypted version of the media stream, to acquire a second encrypted version of the media stream, wherein the DP master device is configured to deactivate the encryptor in case of adoption of the first policy.

18. The DP master device of claim 16, configured to deactivate the encryptor in case of adoption of the first policy.

19. The DP master device of claim 1, configured, when operating according to the second policy, to transmit the media stream at the first resolution as an encrypted media stream and the media stream at the second resolution in plaintext or encrypted according to a standard which comprises a lower level of security than the standard according to which the media stream at the first resolution is encrypted.

20. The DP master device of claim 1, further comprising a trusted environment and a non-trusted environment, the DP master device being configured to encrypt and/or decrypt the media stream in the trusted environment.

21. The DP master device of claim 20, wherein the trusted environment comprises an internal trusted decoder configured to decode the decrypted media stream.

22. The DP master device of claim 21, further comprising an embedded media renderer which comprises a trusted renderer portion in the trusted environment and a non-trusted renderer portion in the non-trusted environment, so that a first media content is rendered by the trusted renderer portion and a second media content different from the first media content, is rendered by the non-trusted environment, wherein the first media content and the second media content are decoded from the decrypted media stream.

23. The DP master device of claim 21, wherein the degradation of the media stream is performed within the trusted environment.

24. A streaming method for providing media content to a plurality of DP client devices, wherein each DP client device is associated with a respective level of security, wherein each level of security is associated with a resolution of the media stream, the method comprising:
receiving a media stream at a determined resolution from a remote content provider;
transmitting, through a local connection, the received media stream to the plurality of DP client devices,
wherein the method comprises operating according to a second policy which is:
the media stream is received at a resolution associated with the DP client device associated with the lower level of security; and
the received media stream is transmitted to all the DP client devices, the media stream being at the resolution associated with the DP client device with the lower level of security;
the media stream is received at the resolution associated with the DP client device with the higher level of security;
the received media stream is transmitted to the DP client devices associated with the higher level of security, the media stream being transmitted at the resolution associated with the to the higher level of security; and
the received media stream is degraded to acquire a degraded media stream at the resolution associated with the lower level of security; and
the degraded media stream is transmitted to the DP client devices associated with the lower level of security, so that the media stream at the resolution associated with the DP client device with the higher level of security and the degraded media stream are transmitted simultaneously,
periodically transmitting, in the local connection, a beacon packet comprising a clock signal data field in which there is encoded the current time according to the DP master device, and
maintaining knowledge of the latency impairing each of the DP client devices from an acknowledgment packet comprising a time stamp data field in which there is provided the playback time which is currently rendered by each of the DP client devices, so that the DP master device indicates, in one field of the beacon packet, the latency of each of the DP client devices.

25. A non-transitory digital storage medium having a computer program stored thereon to perform the streaming method for providing media content to a plurality of DP client devices, wherein each DP client device is associated with a respective level of security, wherein each level of security is associated with a resolution of the media stream, the method comprising:
receiving a media stream at a determined resolution from a remote content provider;
transmitting, through a local connection, the received media stream to the plurality of DP client devices,
wherein the method comprises operating according to a second policy which is:
the media stream is received at a resolution associated with the DP client device associated with the lower level of security; and
the received media stream is transmitted to all the DP client devices, the media stream being at the resolution associated with the DP client device with the lower level of security;
the media stream is received at the resolution associated with the DP client device with the higher level of security;
the received media stream is transmitted to the DP client devices associated with the higher level of security, the media stream being transmitted at the resolution associated with the to the higher level of security; and
the received media stream is degraded to acquire a degraded media stream at the resolution associated with the lower level of security; and
the degraded media stream is transmitted to the DP client devices associated with the lower level of security,
so that the media stream at the resolution associated with the DP client device with the higher level of security and the degraded media stream are transmitted simultaneously, when said computer program is run by a computer,
periodically transmitting, in the local connection, a beacon packet comprising a clock signal data field in which there is encoded the current time according to the DP master device, and
maintaining knowledge of the latency impairing each of the DP client devices from an acknowledgment packet comprising a time stamp data field in which there is provided the playback time which is currently rendered by each of the DP client devices, so that the DP master device indicates, in one field of the beacon packet, the latency of each of the DP client devices.

* * * * *